United States Patent
Nishiumi et al.

(10) Patent No.: US 6,497,618 B1
(45) Date of Patent: *Dec. 24, 2002

(54) VIDEO GAME SYSTEM WITH DATA TRANSMITTING/RECEIVING CONTROLLER

(75) Inventors: Satoshi Nishiumi, Kyoto (JP); Kazuo Koshima, Kyoto (JP)

(73) Assignee: Nintendo Co. Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/422,257

(22) Filed: Oct. 21, 1999

Related U.S. Application Data

(62) Division of application No. 08/849,119, filed as application No. PCT/JP96/02927 on Oct. 9, 1996, now Pat. No. 6,264,558.

(30) Foreign Application Priority Data

| Oct. 9, 1995 | (JP) | ............................................ 7-288006 |
| Nov. 22, 1995 | (JP) | ............................................ 7-328044 |

(51) Int. Cl.⁷ ................................................ A63F 9/22
(52) U.S. Cl. ............................... 463/36; 463/38; 463/44
(58) Field of Search ..................... 463/36, 37, 38–42, 463/43, 44; 345/156, 161, 157, 158, 159, 160; 200/6 A

(56) References Cited

U.S. PATENT DOCUMENTS

| 3,666,900 A | 5/1972 | Rothweiler et al. |
| 3,729,129 A | 4/1973 | Fletcher et al. |
| 3,827,313 A | 8/1974 | Kiessling |
| 4,148,014 A | 4/1979 | Burson |
| 4,161,726 A | 7/1979 | Burson et al. |
| 4,315,113 A | 2/1982 | Fisher et al. |
| 4,359,222 A | 11/1982 | Smith, III et al. |
| 4,467,412 A | 8/1984 | Hoff |
| 4,469,330 A | 9/1984 | Asher |
| 4,485,457 A | 11/1984 | Balaska et al. |
| 4,538,035 A | 8/1985 | Pool |
| 4,552,360 A | 11/1985 | Bromley et al. |
| 4,575,591 A | 3/1986 | Lugaresi |
| 4,587,510 A | 5/1986 | Kim |
| 4,620,176 A | 10/1986 | Hayes |
| 4,639,225 A | 1/1987 | Washizuka |
| 4,659,313 A | 4/1987 | Kuster et al. |
| 4,685,678 A | 8/1987 | Frederiksen |
| 4,748,441 A | 5/1988 | Brzezinski |
| 4,766,423 A | 8/1988 | Ono et al. |
| 4,783,812 A | 11/1988 | Kaneoka |

(List continued on next page.)

FOREIGN PATENT DOCUMENTS

| AT | 90881/91 | 5/1992 |
| DE | 32 04 428 A1 | 8/1983 |
| DE | 40 18 052 | 12/1990 |

(List continued on next page.)

OTHER PUBLICATIONS

US 6,017,271, 1/2000, Miyamoto et al. (withdrawn)
3D Ballz Instruction Booklet, Accolade, San Jose, California, #3050–00231 Rev.A, 1994.

(List continued on next page.)

*Primary Examiner*—Jessica Harrison
(74) *Attorney, Agent, or Firm*—Nixon & Vanderhye

(57) ABSTRACT

A game machine is provided with a controller control circuit including a data transfer control circuit. When the data in a first external RAM attached to a first controller is transferred to a second external RAM attached to a second controller, the data transfer control circuit transmits a predetermined command to the first controller. The data stored in the first external RAM is memorize through a data transfer control circuit. The data transfer control circuit then transmits a predetermined command to the second controller. In response thereto, the data stored in the internal RAM is transmitted to the second controller to be stored in the second external RAM.

18 Claims, 24 Drawing Sheets

U.S. PATENT DOCUMENTS

| | | |
|---|---|---|
| 4,789,932 A | 12/1988 | Cutler et al. |
| 4,799,677 A | 1/1989 | Frederiksen |
| 4,858,930 A | 8/1989 | Sato |
| 4,868,780 A | 9/1989 | Stern |
| 4,875,164 A | 10/1989 | Monfort |
| 4,887,230 A | 12/1989 | Noguchi et al. |
| 4,887,966 A | 12/1989 | Gellerman |
| 4,890,832 A | 1/1990 | Komaki |
| 4,916,440 A | 4/1990 | Faeser et al. |
| 4,924,216 A | 5/1990 | Leung |
| 4,926,372 A | 5/1990 | Nakagawa |
| 4,933,670 A | 6/1990 | Wislocki |
| 4,949,298 A | 8/1990 | Nakanishi et al. |
| 4,974,192 A | 11/1990 | Face et al. |
| 4,976,429 A | 12/1990 | Nagel |
| 4,976,435 A | 12/1990 | Shatford et al. |
| 4,984,193 A | 1/1991 | Nakagawa |
| 5,001,632 A | 3/1991 | Hall-Tipping |
| 5,012,230 A | 4/1991 | Yasuda |
| D316,879 S | 5/1991 | Shulman et al. |
| 5,014,982 A | 5/1991 | Okada et al. |
| 5,016,876 A | 5/1991 | Loffredo |
| D317,946 S | 7/1991 | Tse |
| 5,046,739 A | 9/1991 | Reichow |
| 5,095,798 A | 3/1992 | Okada et al. |
| 5,146,557 A | 9/1992 | Yamrom et al. |
| 5,160,918 A | 11/1992 | Saponsnik et al. |
| 5,203,563 A | 4/1993 | Loper, III |
| 5,207,426 A | 5/1993 | Inoe et al. |
| 5,213,327 A | 5/1993 | Kitaue |
| 5,226,136 A | 7/1993 | Nakagawa |
| 5,237,311 A | 8/1993 | Mailey et al. |
| 5,245,320 A | 9/1993 | Bouton |
| 5,259,626 A | 11/1993 | Ho |
| 5,273,294 A | 12/1993 | Amanai |
| 5,276,831 A | 1/1994 | Nakanishi et al. |
| 5,286,024 A | 2/1994 | Winblad |
| 5,290,034 A | 3/1994 | Hineman |
| 5,291,189 A | 3/1994 | Otake et al. |
| 5,317,714 A | 5/1994 | Nakagawa et al. |
| 5,327,158 A | 7/1994 | Takahashi et al. |
| 5,329,276 A | 7/1994 | Hirabayashi |
| 5,337,069 A | 8/1994 | Otake et al. |
| 5,357,604 A | 10/1994 | San et al. |
| 5,358,259 A | 10/1994 | Best |
| 5,371,512 A | 12/1994 | Otake et al. |
| 5,388,841 A | 2/1995 | San et al. |
| 5,388,990 A | 2/1995 | Beckman |
| 5,390,937 A | 2/1995 | Sakaguchi et al. |
| 5,393,070 A | 2/1995 | Best |
| 5,393,071 A | 2/1995 | Best |
| 5,393,072 A | 2/1995 | Best |
| 5,393,073 A | 2/1995 | Best |
| 5,394,168 A | 2/1995 | Smith, III et al. |
| D357,712 S | 4/1995 | Wu |
| 5,415,549 A | 5/1995 | Logg |
| 5,421,590 A | 6/1995 | Robbins |
| 5,426,763 A | 6/1995 | Okada |
| 5,436,640 A | 7/1995 | Reeves |
| 5,437,464 A | 8/1995 | Terasima et al. |
| 5,451,053 A | 9/1995 | Garrido |
| 5,453,763 A | 9/1995 | Nakagawa et al. |
| D363,092 S | 10/1995 | Hung |
| 5,459,487 A | 10/1995 | Bouton |
| 5,473,325 A | 12/1995 | McAlindon |
| 5,512,920 A | 4/1996 | Gibson |
| 5,513,307 A | 4/1996 | Naka et al. |
| 5,515,044 A | 5/1996 | Glatt |
| 5,551,693 A | 9/1996 | Goto et al. |
| 5,551,701 A | 9/1996 | Bouton et al. |
| 5,558,329 A | 9/1996 | Liu |
| 5,563,629 A | 10/1996 | Caprara |
| 5,566,280 A | 10/1996 | Fukui et al. |
| D375,326 S | 11/1996 | Yokoi et al. |
| 5,577,735 A | 11/1996 | Reed et al. |
| 5,589,854 A | 12/1996 | Tsai |
| 5,593,350 A | 1/1997 | Bouton |
| 5,599,232 A | 2/1997 | Darling |
| 5,607,157 A | 3/1997 | Nagashima |
| 5,615,083 A | 3/1997 | Burnett |
| 5,624,117 A | 4/1997 | Ohkubo et al. |
| 5,628,686 A | 5/1997 | Svancarek et al. |
| 5,632,680 A | 5/1997 | Chung |
| 4,870,389 A | 6/1997 | Ishiwata et al. |
| 5,640,177 A | 6/1997 | Hsu |
| 5,643,087 A | 7/1997 | Marcus et al. |
| 5,649,862 A | 7/1997 | Sakaguchi et al. |
| 5,653,637 A | 8/1997 | Tai |
| 5,663,747 A | 9/1997 | Shulman |
| 5,670,955 A | 9/1997 | Thorne, III et al. |
| 5,680,534 A | 10/1997 | Yamato et al. |
| 5,684,512 A | 11/1997 | Schoch et al. |
| 5,691,898 A | 11/1997 | Rosenberg et al. |
| 5,694,153 A | 12/1997 | Aoyagi et al. |
| 5,704,837 A | 1/1998 | Iwasaki et al. |
| 5,706,029 A | 1/1998 | Tai |
| 5,714,981 A | 2/1998 | Scott-Jackson et al. |
| 5,724,497 A | 3/1998 | San et al. |
| 5,731,806 A | 3/1998 | Harrow et al. |
| 5,734,373 A | 3/1998 | Rosenberg et al. |
| 5,734,376 A | 3/1998 | Hsien |
| 5,734,807 A | 3/1998 | Sumi |
| 5,759,100 A | 6/1998 | Nakanishi |
| 5,769,718 A | 6/1998 | Rieder |
| 5,769,719 A | 6/1998 | Hsu |
| 5,784,051 A | 7/1998 | Harrow et al. |
| 5,785,597 A | 7/1998 | Shinohara |
| 5,786,807 A | 7/1998 | Couch et al. |
| 5,791,994 A | 8/1998 | Hirano et al. |
| 5,793,356 A | 8/1998 | Svancarek et al. |
| 5,804,781 A | 9/1998 | Okabe |
| 5,805,138 A | 9/1998 | Brawne et al. |
| 5,808,591 A | 9/1998 | Mantani |
| 5,816,921 A | 10/1998 | Hosokawa |
| 5,820,462 A | 10/1998 | Yokoi et al. |
| 5,830,066 A | 11/1998 | Goden et al. |
| 5,838,330 A | 11/1998 | Ajima |
| 5,850,230 A | 12/1998 | San et al. |
| 5,862,229 A | 1/1999 | Shimizu |
| 5,867,051 A | 2/1999 | Liu |
| 5,872,999 A | 2/1999 | Koizumi et al. |
| 5,877,749 A | 3/1999 | Shiga et al. |
| 5,880,709 A | 3/1999 | Itai et al. |
| 5,883,628 A | 3/1999 | Mullaly et al. |
| 5,896,125 A | 4/1999 | Niedzwiecki |
| 5,898,424 A | 4/1999 | Flannery |
| 5,946,004 A | 8/1999 | Kitamura et al. |
| 5,963,196 A | 10/1999 | Nishiumi et al. |
| 5,973,704 A | 10/1999 | Nishiumi et al. |
| 5,984,785 A | 11/1999 | Takeda et al. |
| 6,001,015 A | 12/1999 | Nishiumi et al. |
| 6,002,351 A | 12/1999 | Takeda et al. |
| 6,007,428 A | 12/1999 | Nishiumi et al. |
| 6,020,876 A | 2/2000 | Rosenberg et al. |
| 6,022,274 A | 2/2000 | Takeda et al. |
| 6,034,669 A | 3/2000 | Chiang et al. |
| 6,036,495 A | 3/2000 | Marcus et al. |
| 6,042,478 A | 3/2000 | Ng |
| 6,050,718 A | 4/2000 | Schena et al. |
| 6,050,896 A | 4/2000 | Hanado |
| 6,067,077 A | 5/2000 | Martin et al. |

| | | | |
|---|---|---|---|
| 6,071,194 A | 6/2000 | Sanderson et al. |
| 6,078,329 A | 6/2000 | Umeki et al. |
| 6,102,803 A | 8/2000 | Takeda et al. |
| 6,126,544 A | 10/2000 | Kojima |
| 6,126,545 A | 10/2000 | Takahashi et al. |
| 6,146,277 A | 11/2000 | Ikeda |
| 6,149,519 A | 11/2000 | Osaki et al. |
| 6,154,197 A | 11/2000 | Watari et al. |
| 6,169,540 B1 | 1/2001 | Rosenberg et al. |
| 6,175,366 B1 | 1/2001 | Watanabe et al. |
| 6,186,896 B1 | 2/2001 | Takeda et al. |
| 6,196,919 B1 | 3/2001 | Okubo |
| 6,200,253 B1 | 3/2001 | Nishiumi et al. |
| 6,219,033 B1 | 4/2001 | Rosenberg et al. |
| 6,264,558 B1 * | 7/2001 | Nishiumi et al. ............. 463/36 |

FOREIGN PATENT DOCUMENTS

| | | |
|---|---|---|
| EP | 268 419 | 5/1988 |
| EP | 0 431 723 A2 | 6/1991 |
| EP | 0 470 615 | 2/1992 |
| EP | 553 532 | 8/1993 |
| EP | 685 246 | 12/1995 |
| EP | 724 220 | 7/1996 |
| GB | 2 234 575 A | 2/1991 |
| GB | 2 244 546 | 12/1991 |
| GB | 2 263 802 | 8/1993 |
| JP | 50-22475 | 3/1975 |
| JP | 57-2084 | 1/1982 |
| JP | 57-18236 | 1/1982 |
| JP | 57-136217 | 8/1982 |
| JP | 59-40258 | 3/1984 |
| JP | 59-121500 | 7/1984 |
| JP | 61-16641 | 1/1986 |
| JP | 61-198286 | 9/1986 |
| JP | 61-185138 | 11/1986 |
| JP | 62-269221 | 11/1987 |
| JP | 2-41342 | 3/1990 |
| JP | 2-68404 | 5/1990 |
| JP | 2-283390 | 11/1990 |
| JP | 3-16620 | 1/1991 |
| JP | 3-248215 | 11/1991 |
| JP | 4-26432 | 1/1992 |
| JP | 4-20134 | 2/1992 |
| JP | 4-42029 | 2/1992 |
| JP | 4-104893 | 9/1992 |
| JP | 4-291468 | 10/1992 |
| JP | 5-100759 | 4/1993 |
| JP | 5-19925 | 5/1993 |
| JP | 5-177057 | 7/1993 |
| JP | 5-241502 | 9/1993 |
| JP | 6-23148 | 2/1994 |
| JP | 6-54962 | 3/1994 |
| JP | 6-68238 | 3/1994 |
| JP | 6-110602 | 4/1994 |
| JP | 6-114683 | 4/1994 |
| JP | 6-190145 | 7/1994 |
| JP | 6-190147 | 7/1994 |
| JP | 6-205010 | 7/1994 |
| JP | 6-61390 | 8/1994 |
| JP | 6-285259 | 10/1994 |
| JP | 6-315095 | 11/1994 |
| JP | 07068052 | 3/1995 |
| JP | 07088252 | 4/1995 |
| JP | 7-104930 | 4/1995 |
| JP | 7-144069 | 6/1995 |
| JP | 7-222865 | 8/1995 |
| JP | 7-288006 | 10/1995 |
| JP | 7-317230 | 12/1995 |
| JP | 8-45392 | 2/1996 |
| JP | 9-56927 | 3/1997 |
| JP | 97/32641 | 12/1997 |
| WO | 92/09347 | 6/1992 |
| WO | 94/12999 | 6/1994 |
| WO | 97/17651 | 5/1997 |

OTHER PUBLICATIONS

6 Photographs of Sony Play Station: 1)top case and compact disk; 2)hand controller; 3)internal circuit boards(top view); 4)internal circuit boards (top view); 5)compact disk reader (bottom view); and internal main circuit board(bottom view).

Knuckles Chaotix Instruction Manual, Sega, Redwood City, California, #84503 (1995).

Nintendo Power, vol. 30, p. 22, Pilot Wings article.

Nintendo Power, vol. 31. p. 35, Pilot Wings article.

Nintendo Power, vol. 31, pp. 74–76, Pilot Wings article.

Nintendo Power, vol. 38, p. 25, Pilto Wings article.

Nintendo Power, vol. 46, Pilot Wings article.

*Pilot Wings Instruction Booklet,* Super Nintendo Entertainment System, SNS–PW–USA, copyright 1991.

*Pilot Wings,* It's a Festival of Flight, Top Secret Password Nintendo Player's Guide, pp. 82–83 and 160, 1991.

*Pilot Wings,* Soar with the Flight Club, Super Nintendo Entertainment System Player's Guide, pp. 100–105, 1991.

Sega Genesis 32X Instruction Manual, Sega, Redwood City California, #672–2116 (1994).

Sega Genesis Instruction Manual, Sega, Hayward, California, #3701–926–0–01 (1994).

Sonic 2 the Hedgehog Instruction Manual, Sega, Hayward, California, #672–0944 3701–925–0–01(1992).

Sony PlayStation Instruction Manual, and Informational Materials, Sony Computer Entertainment Inc., 1995.

IBM Technical Disclosure Bulletin, vol. 37, No. 8, Aug. 1994, pp. 73–74, "Analog Joystick Interface Emulation Using a Digital Counter".

IBM Technical Disclosure Bulletin, vol. 33, No. 11, Apr. 1991, pp. 105–106, "Hardware Reset With Microcode Warning Period".

Super Mario 64 Player's Guide, Nintendo of America, 1996.

Nintendo Power, "The Fun Machine" for Nintendo 64, 1996.

Nintendo Power, vol. 80, pp. 20–27, Jan. 1996.

*Nintendo Employee Shosinkai Reports,* 14 pages, Nov. 24–26, 1995.

Sega Force/Saturn Tech Specs, Data Information, Saturn Chipset, 1997.

Sega Force/Saturn Peripherals, Data Information, 3D Control Pad, 1997–1999.

Drucker et al., "Cinema: A System for Procedural Camera Movements", *Proceedings of the Symposium on Interactive 3D Graphics,* Cambridge, MA., Mar. 29–Apr. 1, 1992, pp. 67–70.

* cited by examiner

Fig. 5
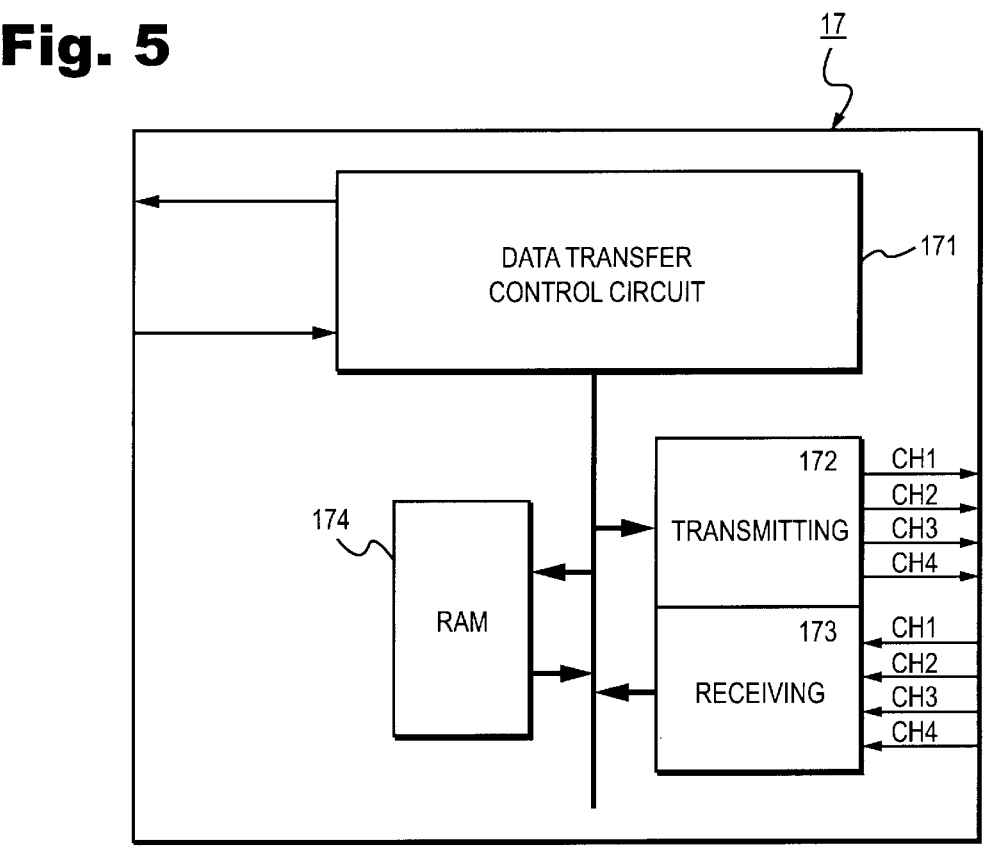
Fig. 6A
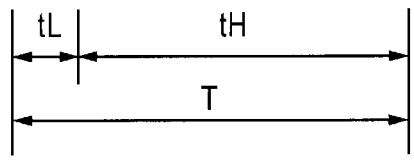
Fig. 6B
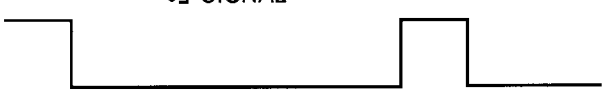
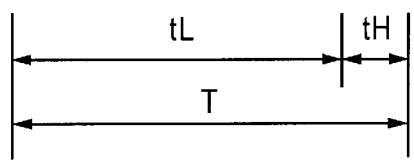

| 1 BYTE | B | A | G | START | ↑ | ↓ | ← | → |
|---|---|---|---|---|---|---|---|---|
| 2 BYTE | JSRST | O | L | R | E | D | C | F |
| 3 BYTE | X ORDINATE |||||||| 
| 4 BYTE | Y ORDINATE ||||||||

Fig. 29
PHYSICAL COORDINATE OF JOYSTICK
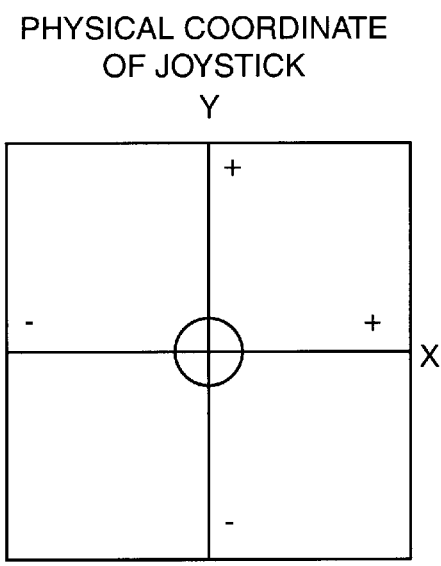
DISPLAY SCREEN
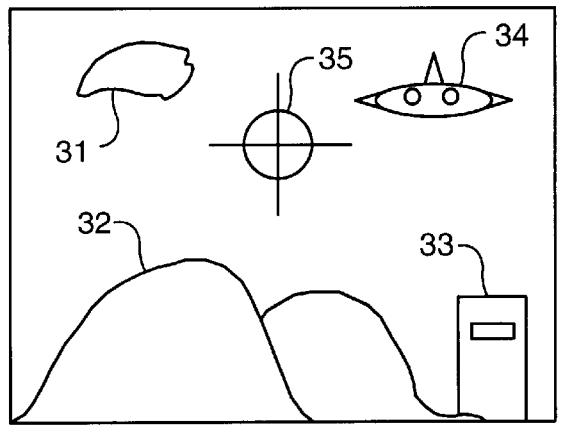
Fig. 30
PHYSICAL COORDINATE OF JOYSTICK
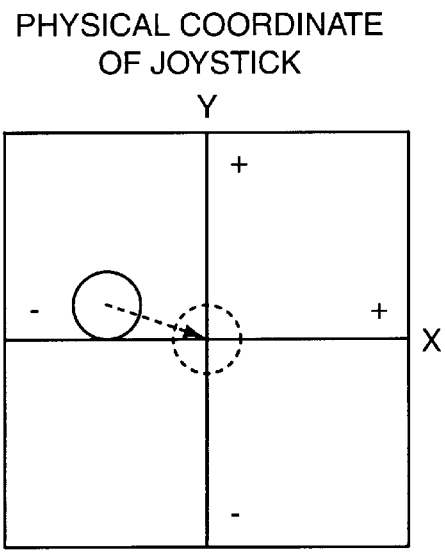
DISPLAY SCREEN
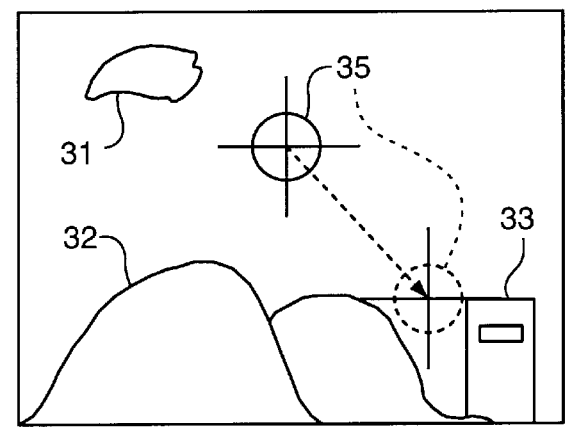

VIDEO GAME SYSTEM WITH DATA TRANSMITTING/RECEIVING CONTROLLER

This is a divisional of application Ser. No. 08/849,119, filed May 28, 1997, now U.S. Pat. No. 6,264,558, which is a 371 of PCT/JP96/02927, filed Oct. 9, 1996.

FIELD OF THE INVENTION

This invention relates to a game machine system having an operating device or game controller. More particularly, this invention relates to a game machine system including a game machine, such as a personal computer or a video game apparatus, and an operating device (controller) for transmitting and receiving data to and from the game machine.

BACKGROUND OF THE INVENTION

FIG. 1 is a block diagram of a conventional electronic game machine 80 and a controller. In the figure CPU 81 (Central Processor Unit) writes data into a W-RAM 83, reads data out of the W-RAM 83 and transmits data to a PPU 84 (Picture Processing Unit), in synchronism with a clock signal and according to program data stored in a ROM 82 (Read Only Memory). The game machine generates a picture image signal which is output by PPU 84 based on image data in V-RAM 85. The CPU 81 also transmits a clock signal to a controller 90A or 90B to directly receive data in synchronism with the clock signal based upon switch actuation by an operator. The CPU 81 outputs data to PPU 84 so as to change the image signal in accordance with the data input from controller 90A or 90B.

The game machine 80 and controllers 90A and 90B are connected by a data line for receiving operating device data from the controllers 90A and 90B and a clock signal line for transmitting a clock signal to the controllers 90A and 90B for synchronizing timing of data transmission from the controller and timing of operation of the CPU 81. The data line is connected directly to the CPU 81 via an interface (not shown). In other words, in the conventional game machine system, data from controllers 90A and 90B is read directly by the CPU 81 which performs image processing at timing based on the clock signal. CPU 81 has to directly read the signals from controllers 90A and 90B, thus increasing the amount of processing by CPU 81. Furthermore, CPU 81 has to read the signal from the controller in synchronism with the clock, so that there needs to be a clock line, in addition to the data line for transmission and reception of data. To this end, there is increase in the number of pins of the connector for connecting between the controller cable and the game machine, raising manufacturing costs. Furthermore, the conventional controllers 90A and 90B each include a plurality of switches and transmission of data to the main-body game machine occurs depending upon whether or not an individual switch is depressed.

As the amount of controller data increases, the amount of time required for the CPU to read controller data also increases. Thus, the CPU has an increases processing burden as the amount of such data increases.

Moreover, conventionally, a clock signal line is required in addition to the data line for connection between a controller and the game machine. Thus, the number of pins of the connector connecting the controller and the game machine is increased, adding to manufacturing costs.

In addition, conventional controllers do not typically permit transmission and reception of data without regard to whether or not an individual switch is depressed. In conventional video game systems, it has been impossible to flexibly utilize a controller in a variety of methods of use by extending its use in various ways after purchasing.

SUMMARY OF THE INVENTION

It is therefore an object of a first invention to provide a game machine which is capable of reducing the amount of CPU processing to secure more time for image processing by the CPU.

It is an object of a second invention to provide a game machine system which is capable of reducing the amount of CPU processing time to secure more time for image processing in the CPU, and to reduce manufacturing costs by reducing the number of connector pins for connecting a controller and the game machine. Also, it is an object to provide a game machine system in which the controller uses may be extended in various ways.

In a first illustrative embodiment, a game machine is connected to a plurality of operation controlling or operating devices adapted to be operated by an operator and to output, by modulation, output device data representative of an operating state of the operating device in response to received command data. The game machine performs image processing based on the operating device data, and includes: a central processing means, an operation storing means, a receiving means, a temporary storing means, a further data processing means, and transmitting means.

The central processing means operates to perform image processing operations based on a predetermined stored program. The operation storing means is accessed by the central processing means and stores data required for advancing a game by the central processing means including data from the operating device. The receiving means receives, by demodulation, the operating device data from the operating device. The temporary storing means temporarily stores the operating device data. The further data processing means carries out predetermined data processing operations according to a command by the central processing means. The transmitting means transmits, by modulation, data output from the further data processing means to the operating device. The central processing means outputs command data for reading out the operating device data. The data processing means outputs the command data from the central processing means to the transmitting means, so that the operating device data received by the receiving means is stored in the temporary storing means to be transferred to the operation storing means.

The game machine system may be connected to a plurality of operating devices to be operated by an operator and a video game processing system carries out image processing based on operating device data from the operating devices. The game machine, includes: a central processing means, an operation storing means, a first receiving means, a temporary storing means, a first data processing means, a first transmitting means, and a connecting means; and the operating device includes: a second receiving means, a wide variety of operation controlling mechanisms including various switches, a second data processing means, and transmitting means.

According to the game machine of an illustrative embodiment of the present invention, the central processing means does not perform reading-in of operating device data each time it uses operating device data, but the operating device data is processed by a means other than the central processing means. It is accordingly possible to realize a game machine in which the amount of processing required by the central processing means is reduced to secure more time for game processing.

Also, operating device data is stored in a memory means that also stores other data required for advancing a game so that the central processing means is allowed to process operating device data similarly to other game data. Therefore the central processing means can perform game processing at high speed and with high freedom.

Furthermore, according to one aspect of the present invention, operating device data can be partially read and accordingly there is no necessity of reading operating device data in its entirety at one time. Therefore unwanted portions of operating device data can be left unread, shortening read-in speed.

According to another aspect, it is possible to store data to be processed by the central processing means into an expansion device such as extension memory connected to the operating device. The expansion device may alternatively be a liquid crystal display.

According to another aspect, it is possible to load the data stored in an extension memory connected to one of a plurality of operating devices into an extension memory connected to another operating device. This enables exchanging of data between players.

Furthermore, according to another aspect, the data in an external memory means is temporarily stored in the operation storing means so that data conversion and copying is possible by the central processing means. This enables data to be copied in a different format than respective external memory means.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing of an exemplary controller control circuit in the FIG. 3 embodiment;

FIG. 6 is an illustrative view showing controller data illustrating a modulating/demodulating method for such data;

FIG. 29 is an illustrative view showing the correspondence of a physical coordinate of the joystick to a display screen;

FIG. 30 is an illustrative view showing the correspondence of the physical coordinate of the joystick to the display screen when resetting an origin point.

EMBODIMENT

Figure 1:
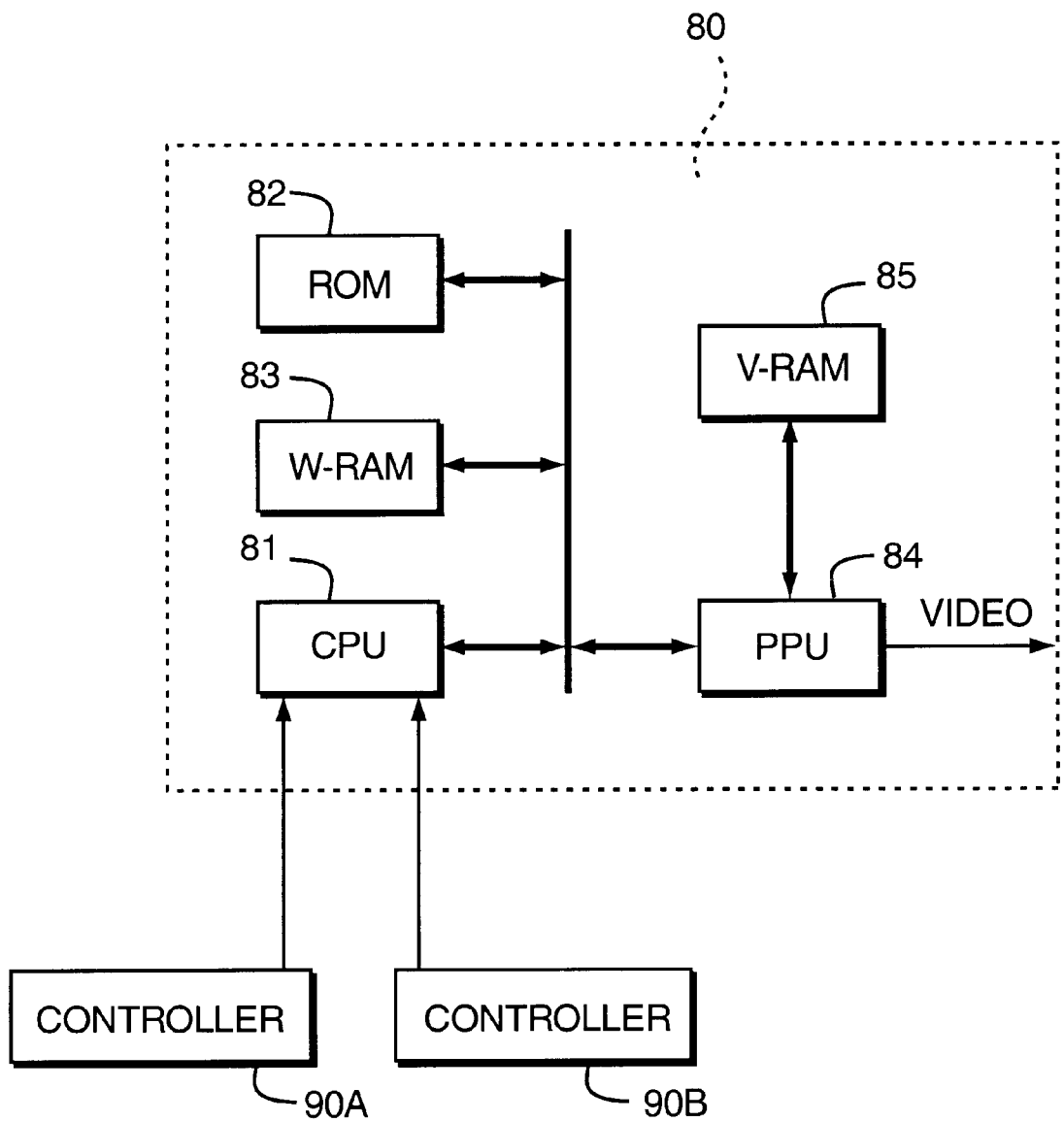
FIG. 1 is a block diagram showing an exemplary conventional video game system.
Figure 2:
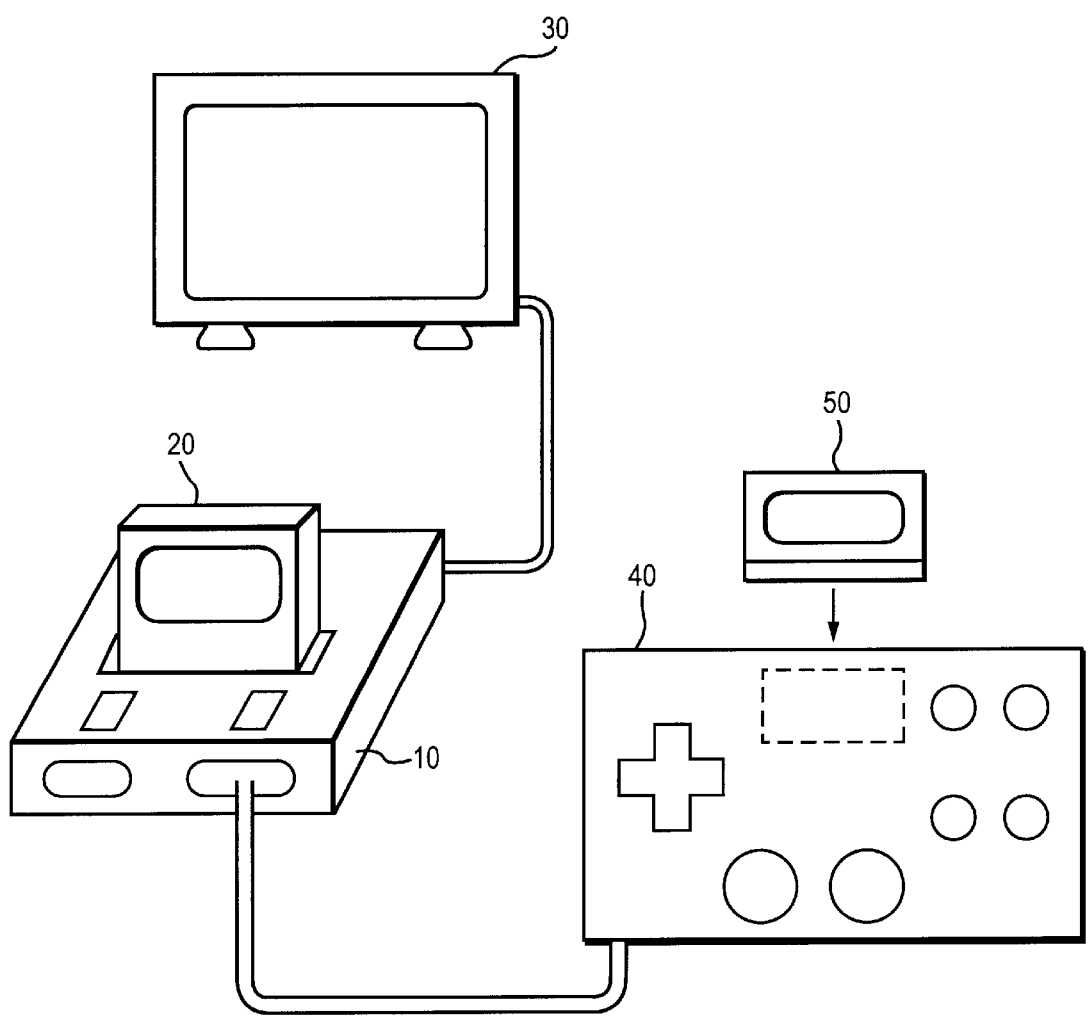
FIG. 2 is an illustrative external view showing one embodiment of an exemplary video game system.

FIG. 2 is an exemplary illustration showing a game machine system according to one illustrative embodiment of the present invention. The game machine system is, for example, a video game machine system, which inclusively comprises a game machine 10, a ROM cartridge 20 (as one example of an external memory device). a monitor 30 (as one example of a display means) connected to the game machine 10, a controller 40 (as one example of a player controller operating device), and a RAM cartridge 50, as one example of an extension device detachably attached to the controller 40. The external memory device stores image data and program data for image processing for games, and audio data for music, sound effects, etc. A CD-ROM or a magnetic disc may alternatively be employed in place of the ROM cartridge. Where the game machine system of this example is applied to a personal computer, an input device such as a keyboard or a mouse is used as the player operating device.

Figure 3:
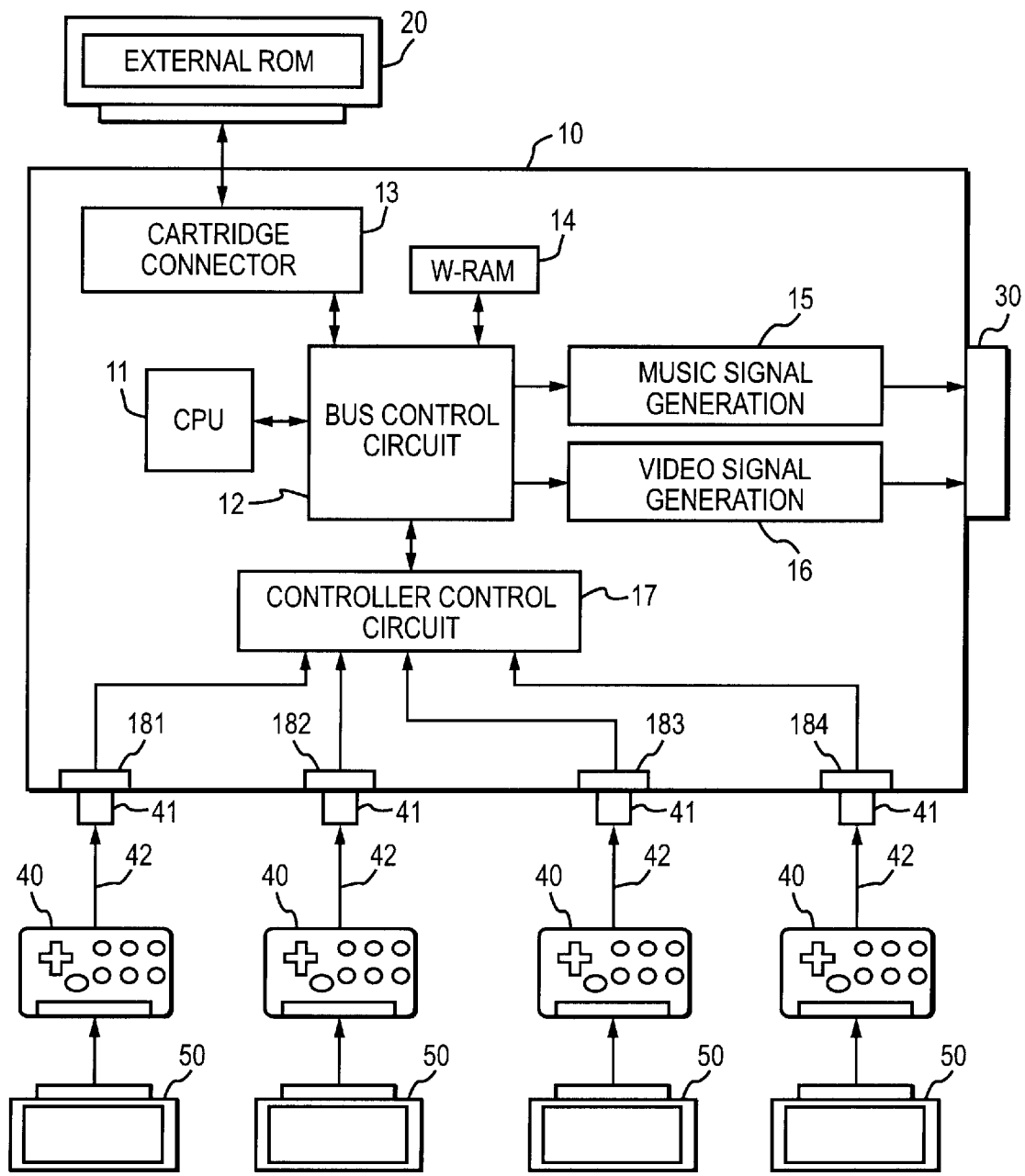
FIG. 3 is an exemplary block diagram showing a game machine in the FIG. 2 embodiment.

FIG. 3 is a block diagram of the game machine system of this example. The game machine 10 incorporates therein a central processor unit (hereinafter "CPU") 11 and a bus control processing circuit 12. The bus control processing circuit 12 is connected to a cartridge connector 13 for detachably attaching the ROM cartridge 20, as well as a working RAM 14. The bus control processing circuit 12 is connected to an audio signal generating circuit 15 for outputting an audio signal processed by the CPU 11 and a video signal generating circuit 16 for outputting a video signal, and further with a controller control circuit 17 for serially transferring operating data of one or a plurality of controller(s) 40 and/or data from RAM cartridge(s) 50. The controller control circuit 17 is connected with controller connectors (hereinafter abbreviated as "connectors") 181–184 which are provided at a front face of the game machine 10. To the connector 18 is detachably connected a connection jack 41 and the controller 40 through a cable 42. Thus, the connection of the controller to the connector 181–184 places the controller 40 into electric connection to the game machine 10, enabling transmission and reception of data therebetween.

More specifically, the bus control processing circuit 12 inputs commands output as parallel signals from CPU 11 via a bus, performs parallel to serial conversion, outputs command as serial signals to the controller control circuit 17, and converts serial signal data input from the controller control circuit 17 into parallel signals and output such signals to the bus. The data output through the bus is subject to processing by CPU 11, or is stored in W-RAM 14. The W-RAM 14 is a memory temporary storing data to be processed by CPU 11, wherein read-out and write-in of data is possible through the bus control circuit 12.

Figure 4:
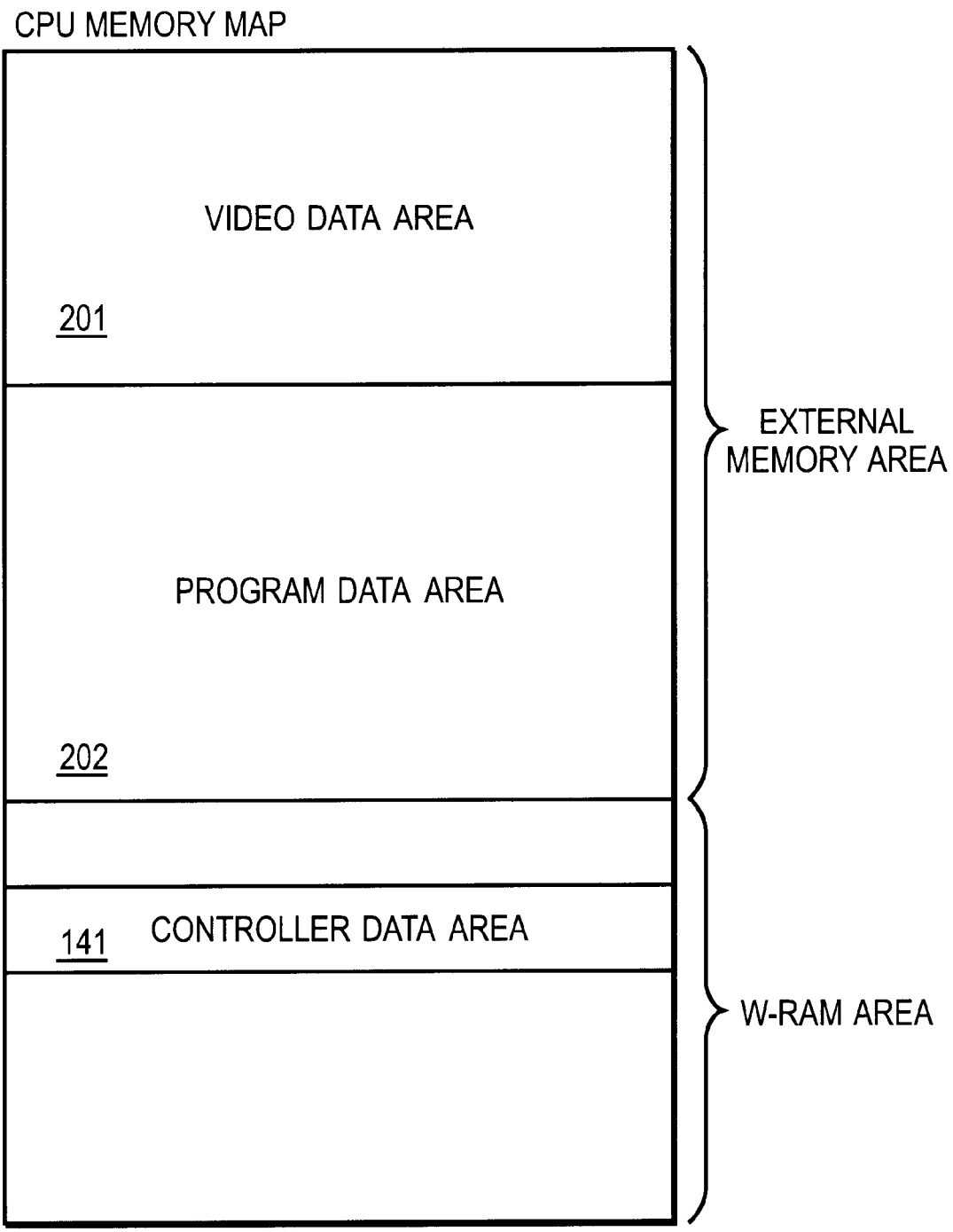
FIG. 4 is an illustrative view showing a CPU memory map of the FIG. 3 embodiment, showing an external memory and a W-RAM address space incorporated in a cartridge.

FIG. 4 is a diagrammatic illustration showing memory regions assigned to respective memory spaces. The memory spaces accessible by the CPU via the bus control processing circuit 12 involves an external memory address space of the ROM cartridge 20 and a memory address space of the W-RAM 14. The ROM cartridge 20 is structured by mounting on a board a ROM stored with data for game processing and accommodating the same board in a housing. The ROM storage data is shown by the external memory region shown in FIG. 4. The ROM includes an image data storage region 201 for storing image data required to cause the game machine 10 to generate image signals for the game, and a program data region 202 for storing program data required for predetermined operation of the CPU 11. In the program data region 202, there are stored an image display program for performing image display processing based on image data 201, a time-measuring program for carrying out measurement of time, and a determination program for determining that the cartridge 20 and an extension expansion device 50, are in a predetermined relationship. The details of the time-measuring program and the determination programs are described below. The memory region of W-RAM 14 includes a controller data region 141 for temporarily storing data representative of an operating state from a control panel.

FIG. 5 is a more detailed circuit diagram of a controller control circuit 17. The controller control circuit 17 transmits and receives data in serial form to and from the bus control processing circuit 12 and the controller connectors 181–184, and includes a data transfer control circuit 171, a signal transmitting circuit 172, a signal receiving circuit 173 and a RAM 174 for temporarily storing transmission and reception data. The data transfer control circuit 171 includes a parallel-serial conversion circuit and a serial-parallel conversion circuit for conversion of data format during data transfer, and also performs control of write-in and read-out of the RAM 174. The above-mentioned serial-parallel conversion circuit converts serial data supplied from the bus control processing circuit 12 into parallel data to provide such data to the RAM 174 or the signal transmitting circuit 172. The parallel-serial conversion circuit converts parallel data supplied from the RAM 174 or the signal receiving circuit 173 into serial data to provide such data to the bus control processing circuit 12. The signal transmission circuit 172 converts parallel data for signal read-in control of the controller 40 supplied from the data transfer control circuit 171 and write-in data (parallel data) to the RAM cartridge 50 into serial data, which serial data is transmitted through a corresponding channel CH1–CH4 to each of the plurality of controllers 40. The signal receiving circuit 173 receives serial read-out data, representative of an operating state of each of the controller 40, input through a corresponding channel CH1–CH4 to each of the controller 40 as well as read-out data from the RAM cartridge 50, to convert such data into parallel data to provide it to the data transfer control circuit 171.

The signal transmitting circuit 172 and the signal receiving circuit 173 in the exemplary embodiment adopt a duty-cycle modulation and demodulation (hereinafter referred to as "modulation/demodulation") method as one example of the modulation/demodulation method that may be employed here. The duty-cycle modulation/demodulation method, as shown in FIG. 6, is a modulation/demodulation method wherein "1" and "0" are represented by varying a Hi time period and a Lo time period for a signal at a certain interval. Explaining the modulation/demodulation method in more detail, when data to be transmitted in serial is a logical "1", a signal having, within one cycle period T, a high-level period tH rendered longer than a low-level period tL (tH>tL) is transmitted. When data to be transmitted is a logical "0", a signal having, within one cycle period T, tH rendered shorter than tL (tH<tL) is transmitted.

The demodulation method includes sampling on a serial signal received (bit transmission signal) to monitor at all times whether the received signal is at a high level or a low level, wherein one cycle is expressed as T=tL+tH, where the time period of low till change to high is tL and time period of high till change to low is tH. In this case, the relationship of tL and tH being tL<tH is recognized as logical "1", while tL>tH is recognized as logical "0", thereby achieving demodulation. If a duty-cycle modulation/demodulation method like this is employed, there is no necessity of transmitting data in synchronism with a clock signal, offering an advantage that transmission and reception of data are available with only one signal line. If two signal lines are available another modulation/demodulation method may be utilized.

Figure 7:
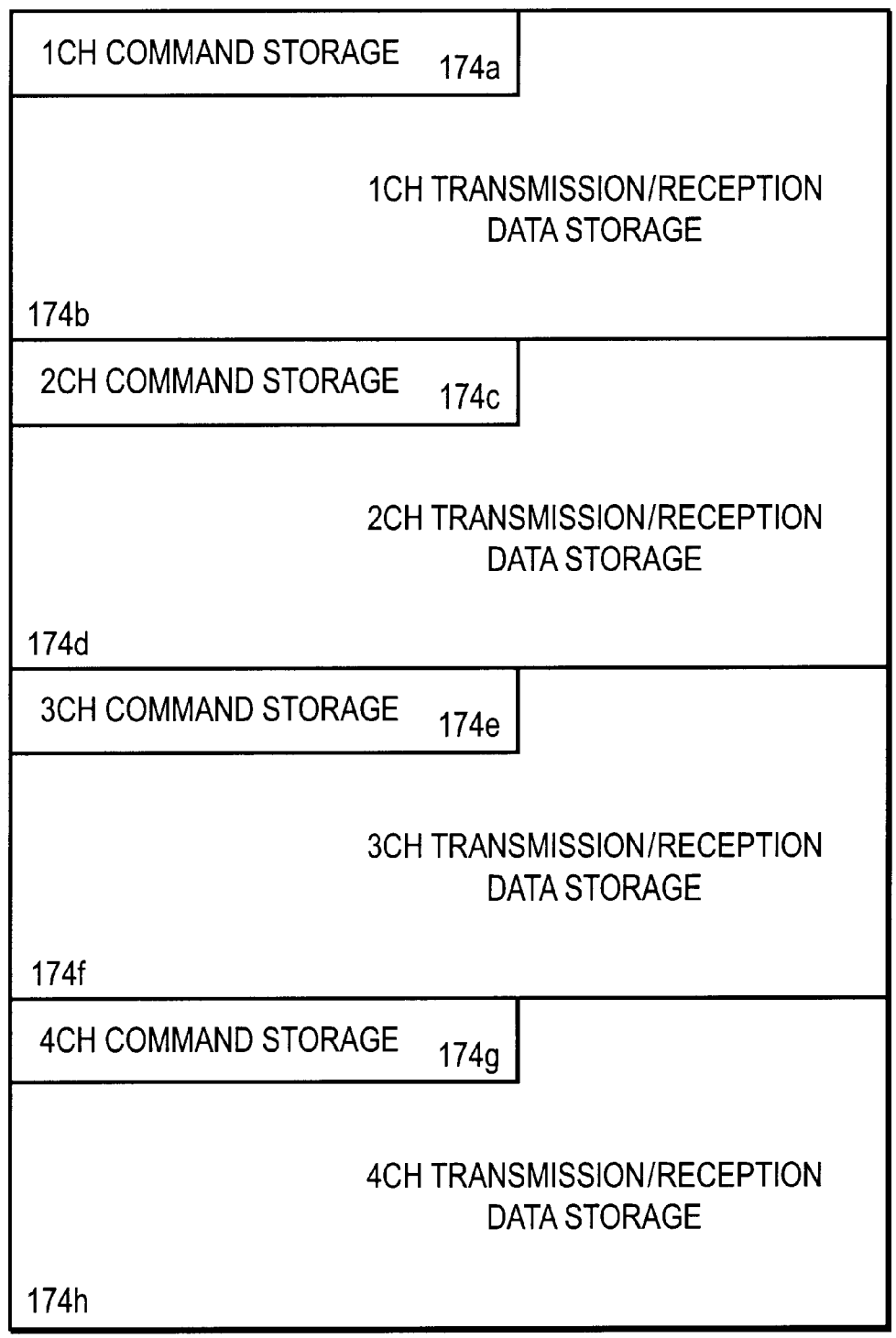
FIG. 7 is an illustrative view showing an exemplary memory map of a RAM in FIG. 5.

The RAM 174 includes memory regions or memory areas 174a–174h as shown in a memory map of FIG. 7. Specifically, the area 174a stores a command for channel 1, while the area 174b stores transmission data and reception data for channel 1. The area 174c stores a command for channel 2, while the area 174d stores transmission data and reception data for channel 2. The area 174e stores a command for channel 3, while the area 174f stores transmission data and reception data for channel 3. The area 174g stores a command for channel 4, while the area 174h stores transmission data and reception data for channel 4.

Accordingly, the data transfer control circuit 171 operates to write-in control to the RAM 174 data transferred from the bus control processing circuit 12 or operating state data of the controller 40 received by the signal receiving circuit 173 or read-out data from the RAM cartridge 50, and read data out of the data 174 based on a command from the bus control circuit 12 to transfer it to the bus control processing circuit 12.

Figure 8:
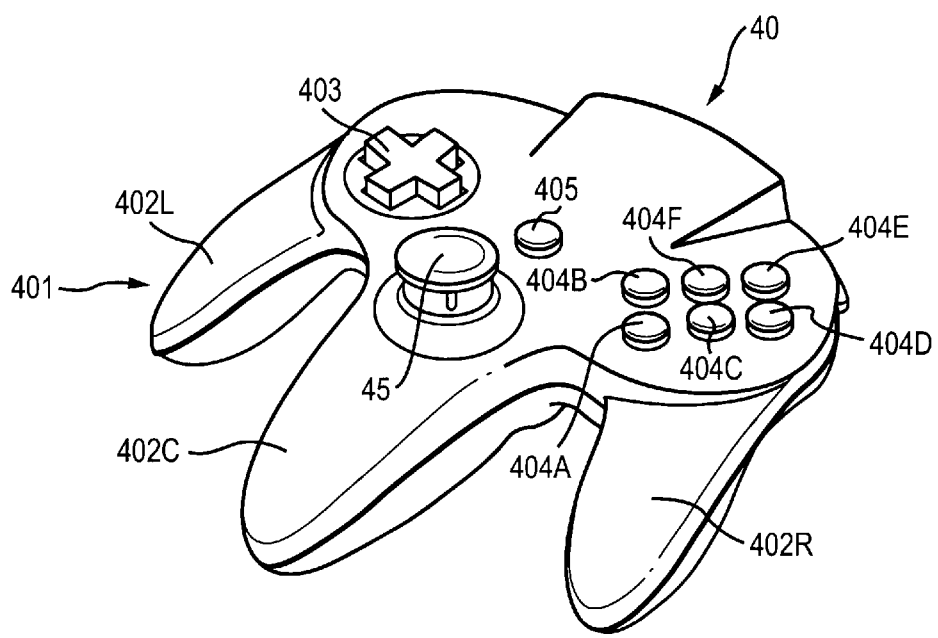
FIG. 8 is a perspective view of a controller of FIG. 3 embodiment as viewed from the top.
Figure 9:
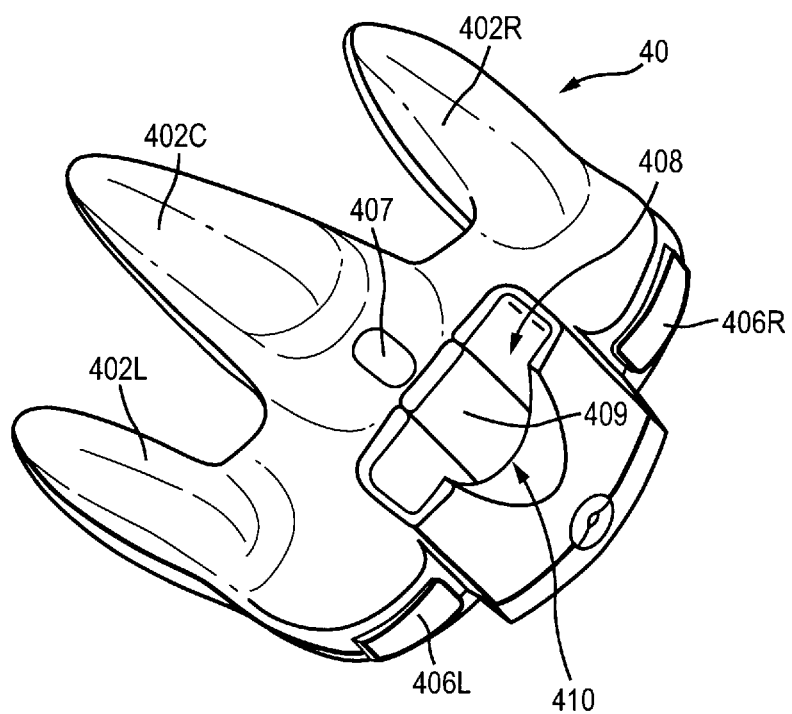
FIG. 9 is perspective view of the controller of FIG. 3 embodiment as viewed from the bottom.

With referring to FIG. 8 and FIG. 9, the controller of this embodiment shown includes a housing 401 consist of an upper half and a lower half. At both left and right ends of the housing 401, a left grip 402L and a right grip 402R are respectively formed in a manner that the same are protruded toward a front side. In an intermediate position between the left grip 402L and the right grip 402R, a center grip 402C is formed in a manner that the same is protruded toward the front side. A cross-direction designation switch 403 which is a digital joystick is formed on a surface of the housing 401 in the vicinity of a base end of the left grip 402L. Action designation switches 404A, 404B, 404C, 404D, 404E and 404F which designate six (6) kinds of actions are respectively formed on the surface of the housing 401 in the vicinity of a base end of the right grip 402R.

An analog joystick 45 which is capable of designating all directions within 360 degrees is formed on the housing 401 in the vicinity of a base end of the center grip 402C. At an approximately central position of the housing 401, a start switch 405 which designates a start of a game is formed. Furthermore, the start switch 405 is positioned at an approximately center of an area surrounded by the switches 403 and 404A to 404F, and the analog joystick 45.

Furthermore, a pair of side surface switches 406L and 406R are formed on a rear surface of the housing 401, and a bottom surface switch 407 is formed at an approximately center of the lower half in the vicinity of the base end of the center grip 402C.

A rear surface of the lower half is extended toward direction of a bottom surface, and an opening portion 408 is formed at a tip end thereof. In an interior of the opening portion 408, a connector (not shown) to which an expansion cartridge 50 shown in FIG. 4 is connected is provided. Furthermore, a lever 409 for discharging the cartridge 50 inserted into the opening portion 408 is formed at a position of the opening portion 408. In addition, at a side opposite to the lever of the opening portion 408 to which the above described expansion cartridge 50 is inserted, a notch 410 is formed, and the notch 410 secures a space for withdrawing the expansion cartridge 50 in discharging the expansion cartridge 50 with utilizing the lever 409.

Now, with referring to FIG. 10 to FIG. 13, the analog joystick 45 will be described in detail. The analog joystick 45 is constructed as a joystick unit as shown in FIGS. 10 to 13. The joystick unit is sandwiched by the upper half and the lower half of the housing 401. The joystick unit includes a housing formed by a case 451 and a cover 452, and an inner case 453 are accommodated within the housing.

Figure 11:
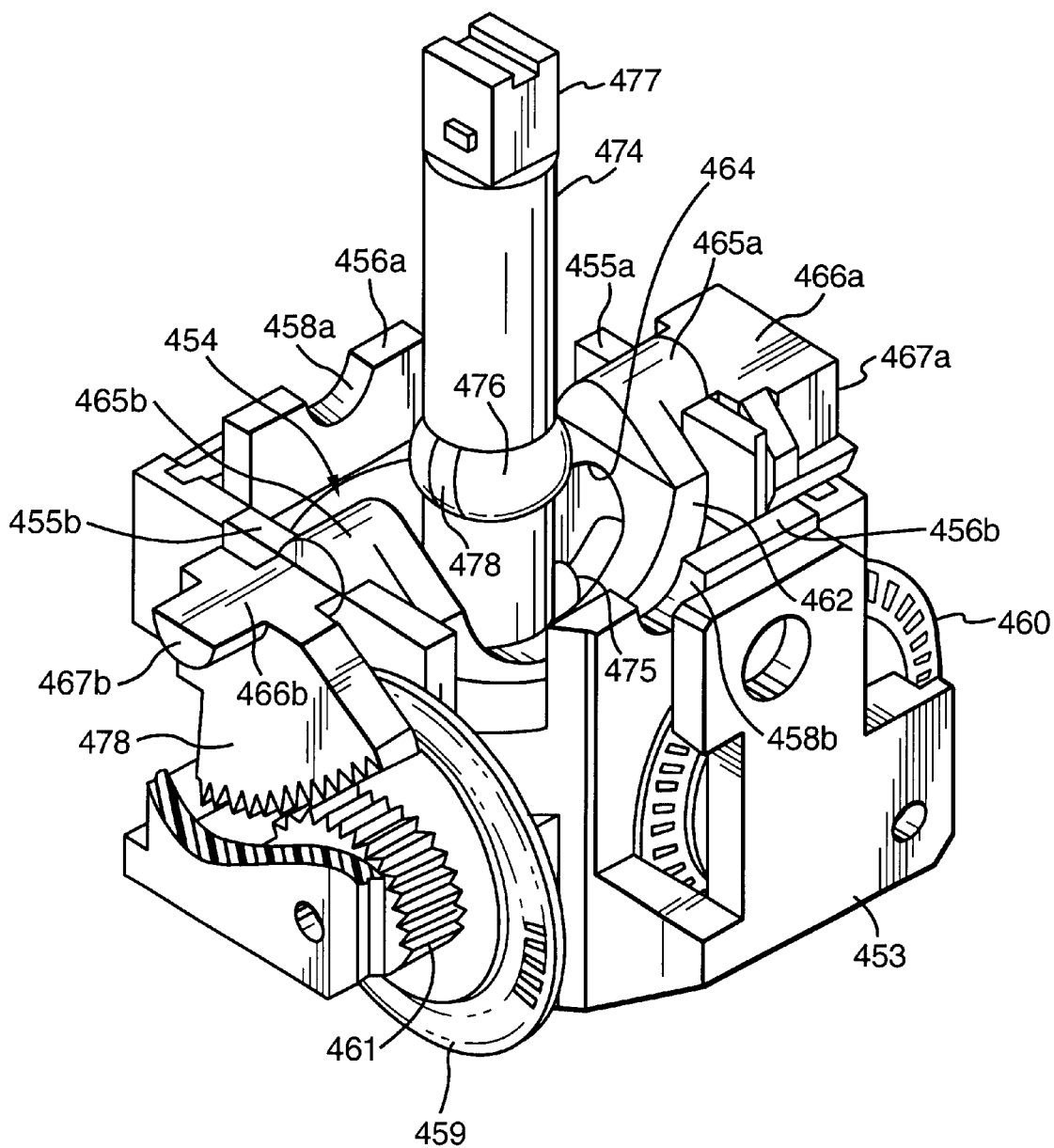
FIG. 11 is a perspective view showing major portions of the FIG. 10 unit.
Figure 12:
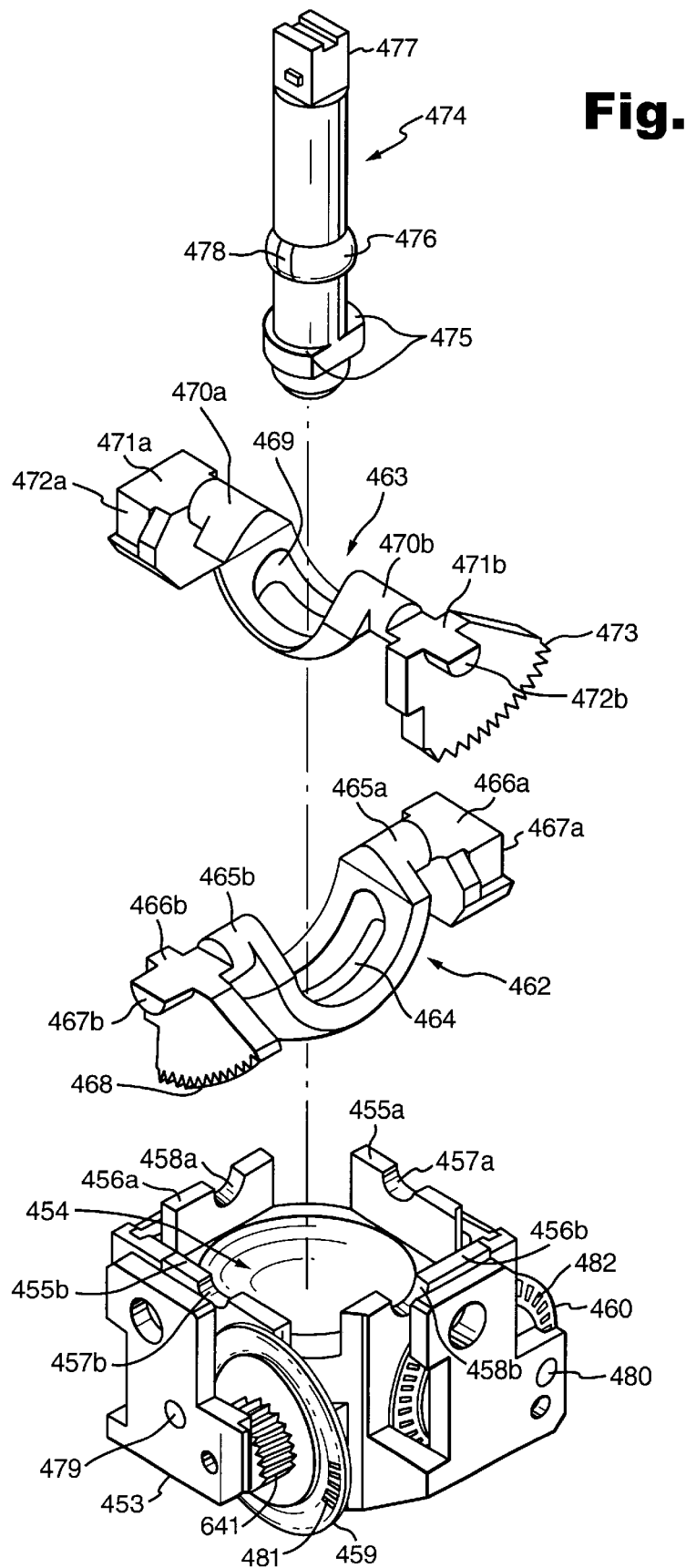
FIG. 12 is an exploded perspective view showing major portions of the FIG. 10 unit.

As shown in FIG. 11 and FIG. 12, the inner case 453 includes a bowl-shaped recess portion 454 formed at a center of the inner case 453, and two pairs of support plates 455a and 455b, and 456a and 456b are provided around the recess portion 454 with angle-interval of 90 degrees, and semicircular bearings 457a and 457b, and 458a and 458b are formed on the support plates 455a and 455b, and 456a and 456b, respectively. The bearings 457a and 457b or 458a and 458b are arranged on the same axis line, and axes of the bearings 457a and 457b, and 458a and 458b are at the same height level, and orthogonally intersect each other. Wheels 459 and 460 having rotation shafts which orthogonally intersect each other are rotatably supported at a side surface of the inner case 453, and gears 461 are uniformly formed on the respective wheels 459 and 460.

The analog joystick unit further includes swingable members 462 and 463. One swingable member 462 is formed by an arc-like member which is provided with a long hole 464 being made long in a longitudinal direction of the arc-like member, and supporting shafts 465a and 465b are formed at both ends of the swingable member 462, and shaft end portions 467a and 467b respectively having flat surfaces 466a and 466b are extended from the supporting shafts 465a and 465b, and a sector gear 468 is provided on one shaft end portion 467b. The other swingable member 463 is different from the one swingable member 462 in that the swingable member 463 is constructed by an arc-like member having a radius of curvature smaller than that of the swingable member 462; however, in other aspects, the swingable member 463 is constructed in a manner similar to or the same as the swingable member 462. That is, a reference numeral 469 denotes a long hole, reference numerals 470a and 470b denote supporting shafts, reference numerals 471a and 471b denote flat surfaces, reference numerals 472a and 472b denote shaft end portions, and a reference numeral 473 denotes a sector gear.

The supporting shafts 465a and 465b, and 470a and 470b are individually inserted into the two sets of bearings 457a and 457b, and 458a and 458b of the inner case 453, and therefore, the part of the swingable members 462 and 463 can be supported in a swing-free fashion, and the swingable members 462 and 463 are arranged so that the longitudinal directions of the long holes 464 and 469 orthogonally intersect each other and are overlaid with an interval or gap. In the pair of swingable members 462 and 463 thus attached to the inner case 453, the sector gears 468 and 469 engage the above described gears 461. Furthermore, respective ones of the above described flat surfaces 466a and 466b, and 471a and 471b are included in the same horizontal plane in a neutral state of a lever 474 (described later).

As shown in FIG. 12, the lever 474 includes protrusions 475 which protrude toward outer radius directions at one end of the lever 474, and a ball portion 476 at a middle portion of the lever 474, and a connection portion 477 at the other end of the lever 474. Grooves 478 which extend in a latitude direction at positions apart from each other by 180 degrees are formed on the above described ball portion 476. The diameter of the lever 474 is selected at a size which is not larger than the sizes of the short directions of the long holes 464 and 469 formed on the swingable members 462 and 463. Preferably, the diameter of the lever 474 is selected at a size by which the lever 474 can be slidably inserted into the long holes 464 and 469 without shaking. Then, the one end portion of the lever 474 penetrates through the long holes 464 and 469, and the protrusions 475 fit into the long hole 464 of a lower side swingable member 462. Therefore, the protrusions 475 of the lever 474 are arranged to be protruded in a direction orthogonally intersected to the longitudinal direction of the long hole 469 of an upper swingable member 463 being attached to the inner case 453, and therefore, if the lever 474 is pulled-up, the protrusions 475 are prevented from being slipped-off by the upper swingable member 463.

Figure 10:
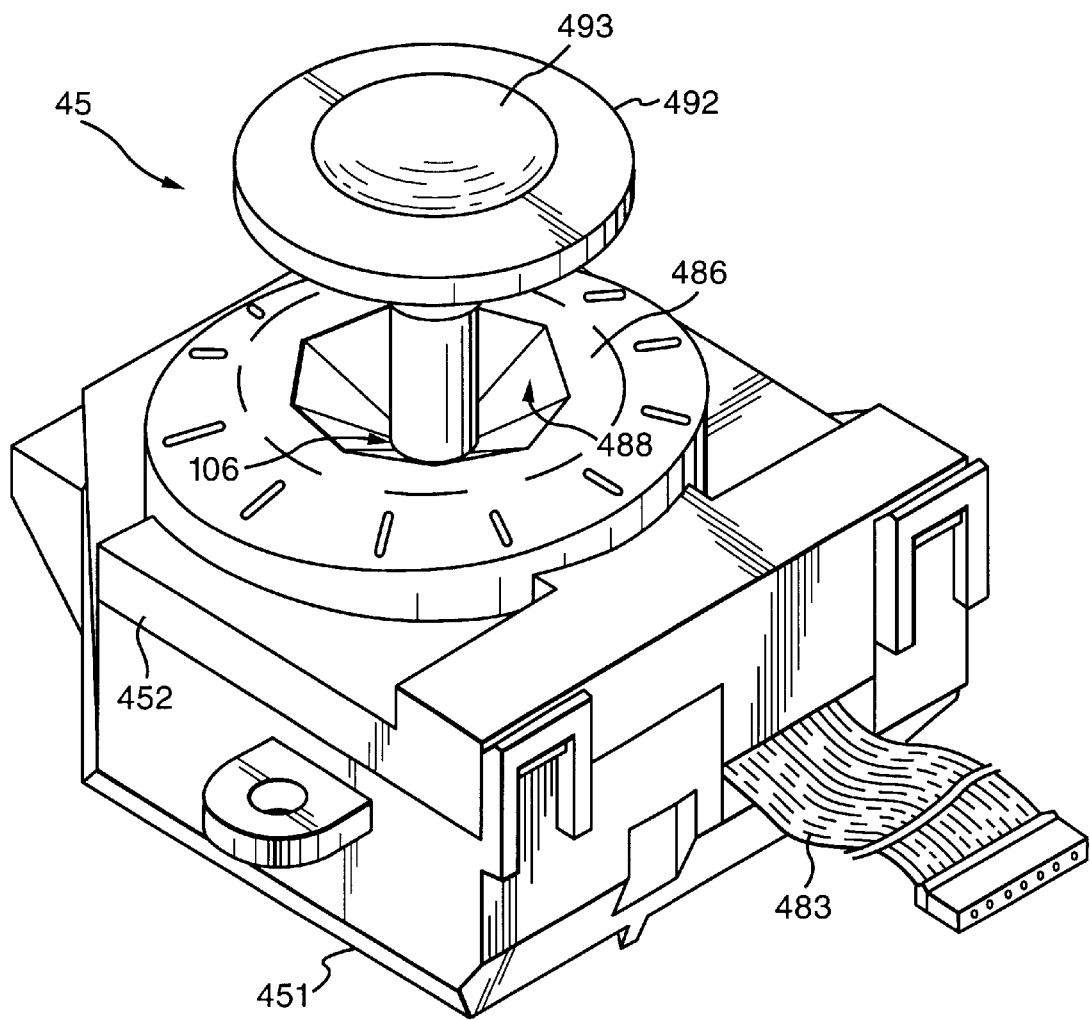
FIG. 10 is a perspective view of showing an analog joystick unit capable of being utilized in the embodiment.

A mechanical structure portion assembled as shown in FIG. 11 is accommodated within the outer case 451 shown in FIG. 10. At this time, the inner case 453 is fixed to the outer case 451 by a suitable means such as screws (not shown).

Then, as well seen from FIG. 12 there are provided on the inner case 453 photo-interrupters 479 and 480 which are opposite to the two wheels 459 and 460. The photo-interrupters 479 and 480 respectively include light-emitting elements and light-receiving elements (both not shown), and lights emitted by the light-emitting elements are received by the light-receiving elements through slits 481 and 482 respectively formed on the wheels 459 and 460. Therefore, the photo-interrupters 479 and 480 respectively detect the slits 481 and 482, and in response to the slits 481 and 482, outputs pulse signals according to rotations of the wheels 459 and 460.

In addition, the height level of swing-shafts (supporting shafts 465 and 470) of the swingable members 462 and 463 are coincident with a height level of a center of the ball portion 476 of the lever 474. Furthermore, a printed-circuit board (not shown) to which a flexible wiring plate 483 is connected is assembled in the outer case 451, and the light-emitting elements and the light-receiving elements included in the photo-interrupters 479 and 480 are electrically connected to printed patterns of the board.

Figure 13:
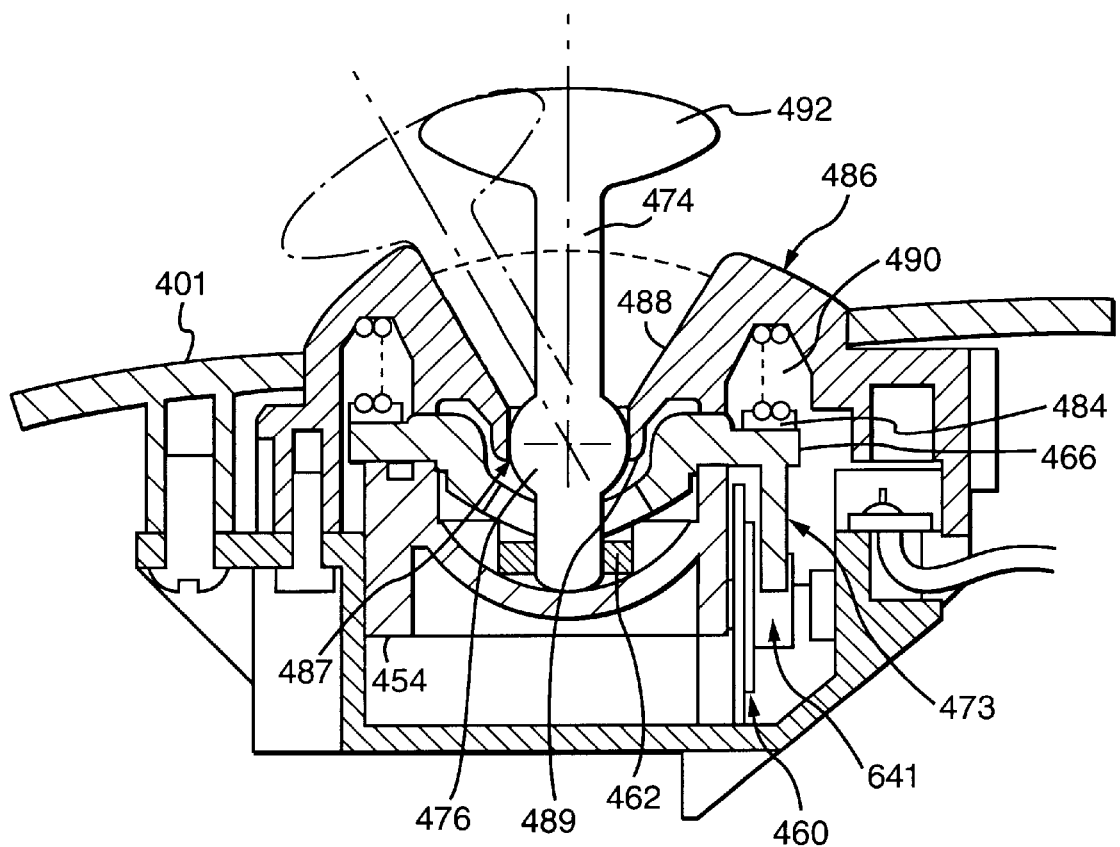
FIG. 13 is a sectional illustrative view showing major portions of the FIG. 10 unit.

As shown in FIG. 13, a grooved ring 484 is supported above the flat surfaces 466 and 471 provided on the pair of swingable members 462 and 463, and a coil spring 485 is arranged above the grooved ring 484. The grooved ring 484 is one example of a pushing-down member, and in the neutral state of the lever 474, a lower surface of the ring 484 becomes in horizon, and the lower surface of the ring 484 and the above described flat surfaces 466 and 471 are brought into surface-contact with each other.

As shown in FIG. 13, a guide ring 486 is attached to the cover 452, and a circular hole 487 is formed at a center portion of the guide ring 486. The guide ring 486 further includes a guide wall 488 which is a rising slope raised from an inner periphery defining the hole 487 toward an outer periphery of the guide ring 486. That is, the guide wall 488 is formed as a whole in "an earthenware mortar" or "cone"-shape. Then, in viewing the guide wall 488 from above, the guide wall 488 has an outer edge 491 which becomes octagonal as seen from the above.

In addition, a diameter of the hole 487 is selected to a size that is the same or approximately the same as a diameter of an outer peripheral surface of the ball portion 476 of the above described lever 474. Therefore, as shown in FIG. 13, the inner edge defining the hole 487 is brought into contact with the ball portion 476 of the lever 474, and therefore, the lever 474 is supported by the ball portion 476 and the hole 487 in a manner that the lever 474 can be swung or inclined in any direction. Furthermore, circular bosses 489 are formed at two positions apart from each other by 180 degrees on the inner edge defining the hole 487 of the guide ring 486 in a manner that the bosses 489 protrude toward an inner radius direction of the hole 487, and the bosses 489 individually fit into the grooves 478 formed in the latitude direction of the above described ball portion 476. Therefore, the lever 474 can be swung around an axis of the bosses 489, but the lever 474 can not be rotated around the axis of the lever 474 itself. Therefore, the lever 474 is prevented from being rotated around its axis by the grooves 478 of the ball portion 476 and the bosses 489.

Furthermore, if the cover 452 is attached to the case 451, a spring 490 is sandwiched and compressed between the grooved ring 484 and the cover 452. Therefore, the flat surfaces 466 and 471 of the pair of swingable members 462 and 463 are always depressed by a force of the spring 490 via the grooved ring 484, and by such a depression force, the pair of swingable members 462 and 463 are always elastically biased so that attitude of both members 462 and 463 is not in any direction, and therefore, the lever 474 has a vertical attitude, that is, the lever 474 is always elastically biased into its neutral state.

The lever 474 is provided with an operating knob 492 which is attached to the lever 474 via the connection portion 477. On an upper surface of the operating knob 492, a recess portion 493 is formed such that a finger of the hand can easily put on the knob 492.

In the above described analog joystick unit, according to an inclined direction and an inclined angle of the lever 474, the swingable members 462 and/or 463 are swung, and then, the wheels 459 and/or 460 are rotated in accordance with the inclined angle of the swingable members 462 and/or 463, and therefore, pulses according to rotation amounts of the wheels 459 and/or 460 are outputted, and the pulses are utilized as coordinate signals in an X axis and/or a Y axis directions.

Figure 14:
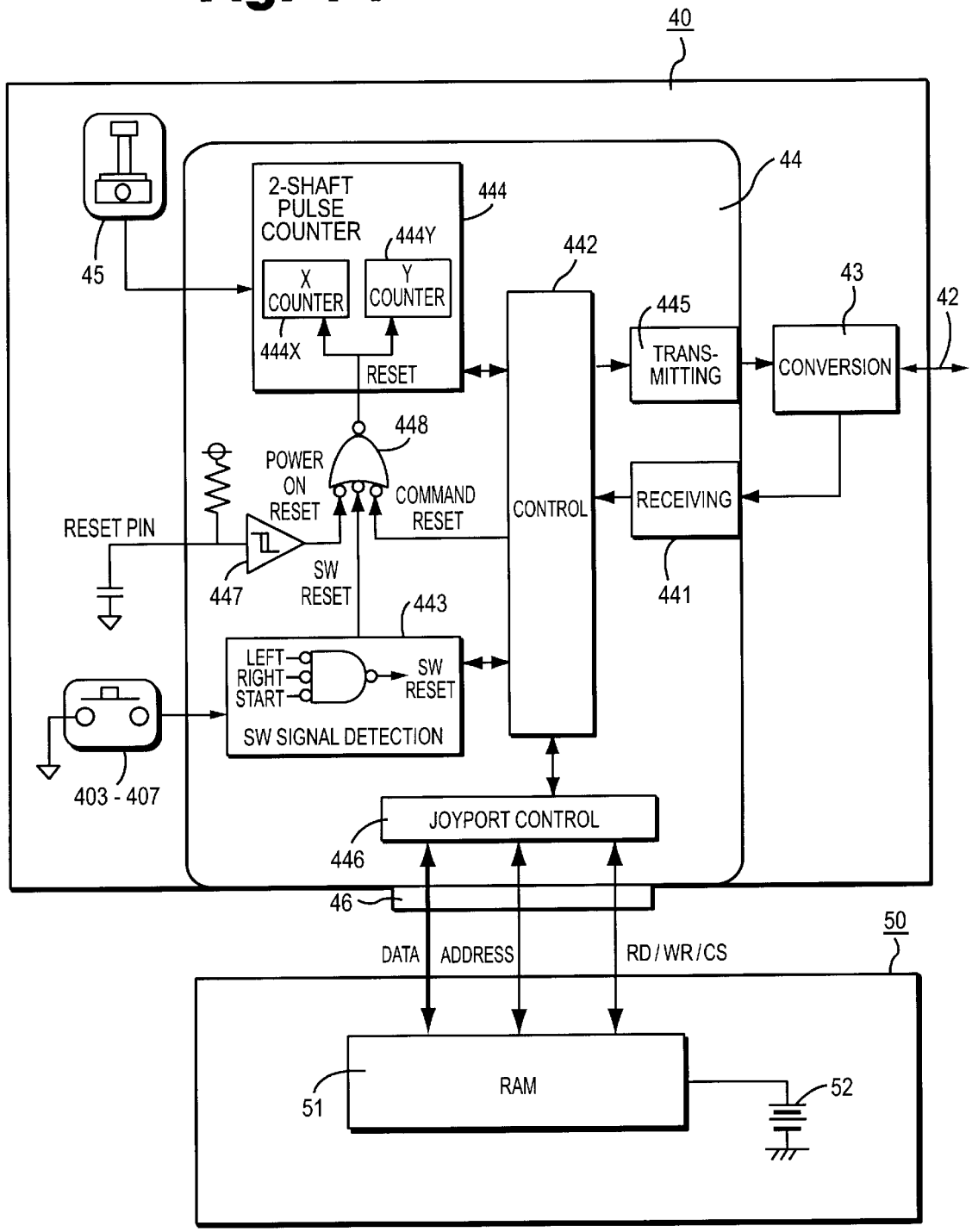
FIG. 14 is a block diagram showing in detail one example of the controller and an expansion device.

FIG. 14 is a detailed circuit diagram of a controller 40 and a RAM cartridge 50 (as one example of an extension device). The controller 40 incorporates within its housing, electronic circuits such as an operation signal processing circuit 44, etc. in order to detect operating states of the switches 403–407 or the joystick 45 or the like and transfer detected data to the controller control circuit 17. The operation signal processing circuit 44 includes a signal receiving circuit 441, a control circuit 442, a switch signal detecting circuit 443, a counter 444, a signal transmitting circuit 445, a joyport control circuit 446, a reset circuit 447 and a NOR gate 448.

The signal receiving circuit 441 converts a serial signal, such as a control signal transmitted from the controller control circuit 17, write-in data to the RAM cartridge 50, etc., into a parallel signal to supply it to the control circuit 442. The control circuit 442 generates a reset signal to cause resetting (e.g., setting to 0) on measured values of an X-axis counter 444X and a Y-axis counter 444Y included in the counter 444, when the control signal transmitted from the controller control circuit 17 is a reset signal for an X, Y coordinate of the joystick 45. The joystick 45 includes photo-interrupters for the X-axis and Y-axis so as to generate the number of pulses proportional to the amount of inclination of a lever in directions of X-axis and Y-axis, providing respective pulse signals to the counters 444X and 444Y. The counter 444X, when the joystick 45 is inclined in the X-axis direction, measures the number of pulses generated in proportion to the amount of inclination. The counter 444Y measures the number of pulses generated in proportion to the amount of inclination, when the joystick 45 is inclined in the Y-axis direction. Accordingly, the resultant vector, determined by the measured values in X-axis and Y-axis of the counter 444X and the 444Y, determines the direction of movement and the coordinate position for the heroic character or the cursor. The counter 444X and the counter 444Y are also reset of their measured values by a reset signal supplied from the reset signal generating circuit 447 upon turning on the power supply, or a reset signal supplied from the switch signal detecting circuit 443 when the player depresses simultaneously two switches previously determined.

The switch signal detecting circuit 443 responds to an output command signal representing a switch state supplied at a constant period (e.g., at a ⅟₃₀-second interval as a frame period of a television), and reads a signal that is varied by the state of depression of the cross switch 403 and the switches 404A–404F, 405, 406L, 406R and 407 to supply it to the control circuit 442.

The control circuit 442 responds to a read-out command signal of operating state data from the controller control circuit 17, and supplies the operating state data of the switches 403–4407 and the measuring values of the counters 444X, 444Y to the signal transmitting circuit 445 in a predetermined data-format order. The signal transmitting circuit 445 converts these parallel signals output from the control circuit 442 into serial data to transfer them to the controller control circuit 17 via a conversion circuit 43 and a signal line 42.

The control circuit 442 is connected to an address bus, a data bus, and a port control circuit 446 through a port connector. The port control circuit 446 performs input-output control (or signal transmission or reception control) on data according to commands by the CPU 11, when the RAM cartridge 50 (as one example of an extension device) is connected to a port connector 46. The RAM cartridge 50 includes a RAM 51 connected to the address bus and the data bus and a battery 52 connected thereto for supplying power source to the RAM 51. The RAM 51 is a RAM that has a capacity lower than a half of a maximum memory capacity accessible by using an address bus, and is comprised, for example, of a 256 k-bit RAM. The RAM 51 stores backup data associated with a game, so that, if the RAM cartridge 50 is removed out the port connector 46, the stored data is kept by receiving power supply from the battery 52.

Figures 15, 17:
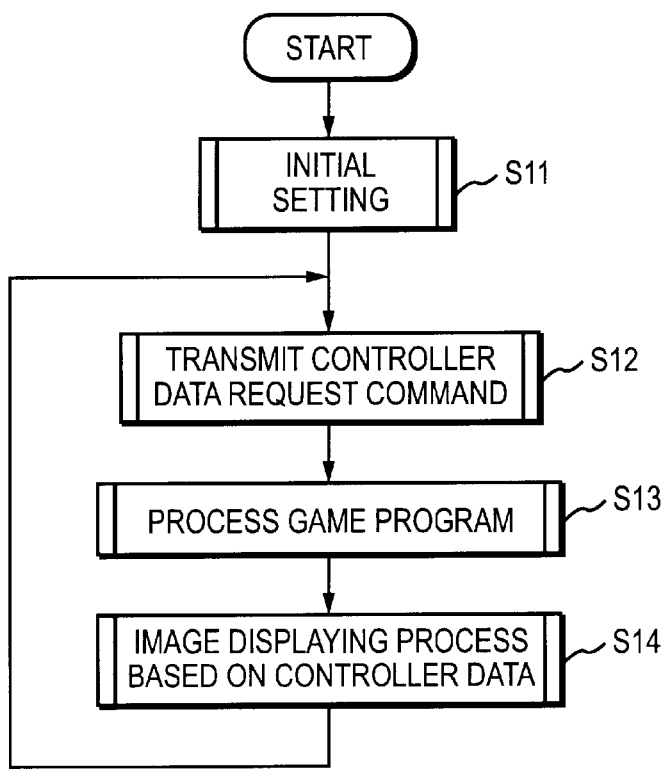
FIG. 15 shows illustrative data of the analog joystick and respective buttons of the controller.
FIG. 17 is a flowchart showing operation of the CPU of FIG. 3 embodiment.

FIG. 15 is a graphical illustration of a data format by which the game machine or image processing apparatus reads out data representative of an operating state of switches 403–407 and joystick 45 from the controller 40. The data generated by the controller 40 is configures as 4-byte data. The first-byte represents B, A, G, START, upper, lower, left and right, i.e., represents the depression of the switch 404B, 404A, 407, 405 and the four cross switch 403 directions. For example, when the button B, i.e., the switch 404B, is depressed, the highest order bit of the first byte becomes "1". Similarly, the second-byte represents JSRST, 0 (not employed in the embodiment), L, R, E, D, C and F, i.e., the depression of the switch 409, 406L, 406R, 404E, 404D, 404C and 404F. The third byte represents by binary digit the X coordinate value (the value measured by the X counter 444X) dependent upon the inclination angle of the joystick 45 in the X direction. The fourth byte represents by binary digit the Y coordinate value (the value measured by the Y counter 444Y) which value is dependent upon the inclination angle of the joystick 45 in the Y direction. Because the X and Y coordinate values are expressed by 8 bits of binary digits, the conversion into decimal digits makes it possible to represent the inclination of the joystick 45 by a numeral from 0–225. If the highest order bit is expressed by a signature denoting a negative value, the inclination angle of the joystick 45 can be expressed by a numeral between −128 and 127.

Figure 16:
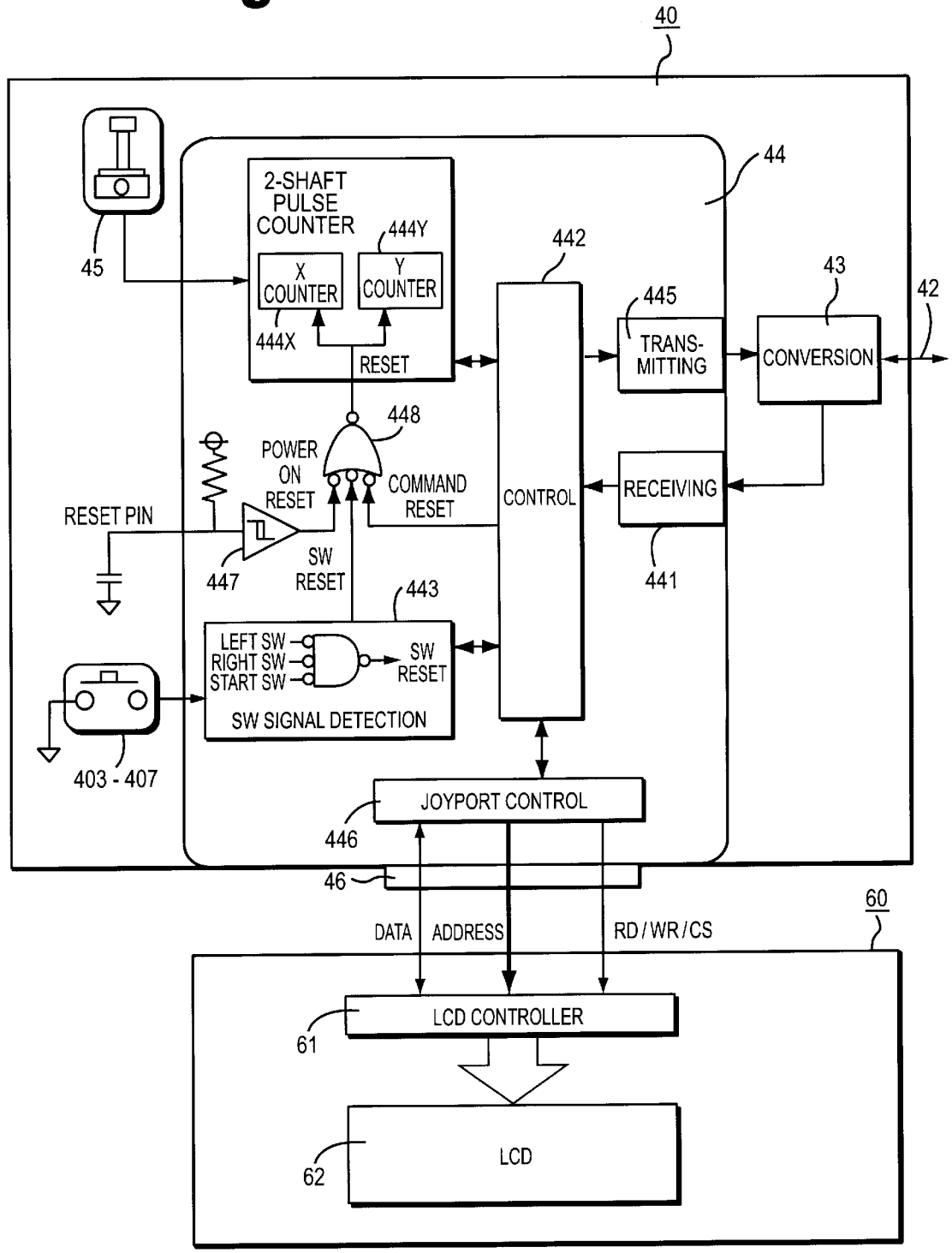
FIG. 16 is a block diagram showing in detail another example of the controller and an expansion device.

FIG. 16 shows an embodiment wherein an extension device 60 including an LCD (Liquid Crystal Display) 62 and an LCD controller 61 is connected to a controller 40. In this embodiment, when the extension device 60 is connected to the connector 46, the LCD controller 61 is electrically connected to the joy port control circuit 446 to be enabled to transmit and receive data. The LCD controller 61 outputs an image signal to the LCD 62 based on data outputted from the joy port control circuit 46. The LCD 62 displays an image picture in accordance with the image signal from the LCD controller 61.

Incidentally, although the extension device 50 including the RAM and the extension device 60 including the LCD 62 were employed, it is possible to utilize an arbitrary extension device that is adapted to transmit and/or receive data to operate.

Explanation is next made as to transmission and reception of data between the game machine 10 and the controller 40.

Referring first to a flowchart for the CPU of the game machine 10 in FIG. 17, explanations will be made on image processing. At a step S11, the CPU 11 is initialized based on an initial value (not shown) stored in the program data area 202 in FIG. 4. Then, at a step S12, the CPU 11 outputs a control pad data request command stored in the program data area 202 to the bus control circuit 12. At a step S13, the CPU 11 carries out the desired image processing based on the program stored in the program data area 202 and the image data area 201. While the CPU 11 is executing step S13, the bus control processing circuit 12 is executing steps S21–S24. Then, at a step S14, the CPU 11 outputs image data based on the control pad data stored in the control pad data area 141 in FIG. 4. After completing step S14, the CPU branches to steps S12 and repeats the execution of steps S12–S14.

Figure 18:
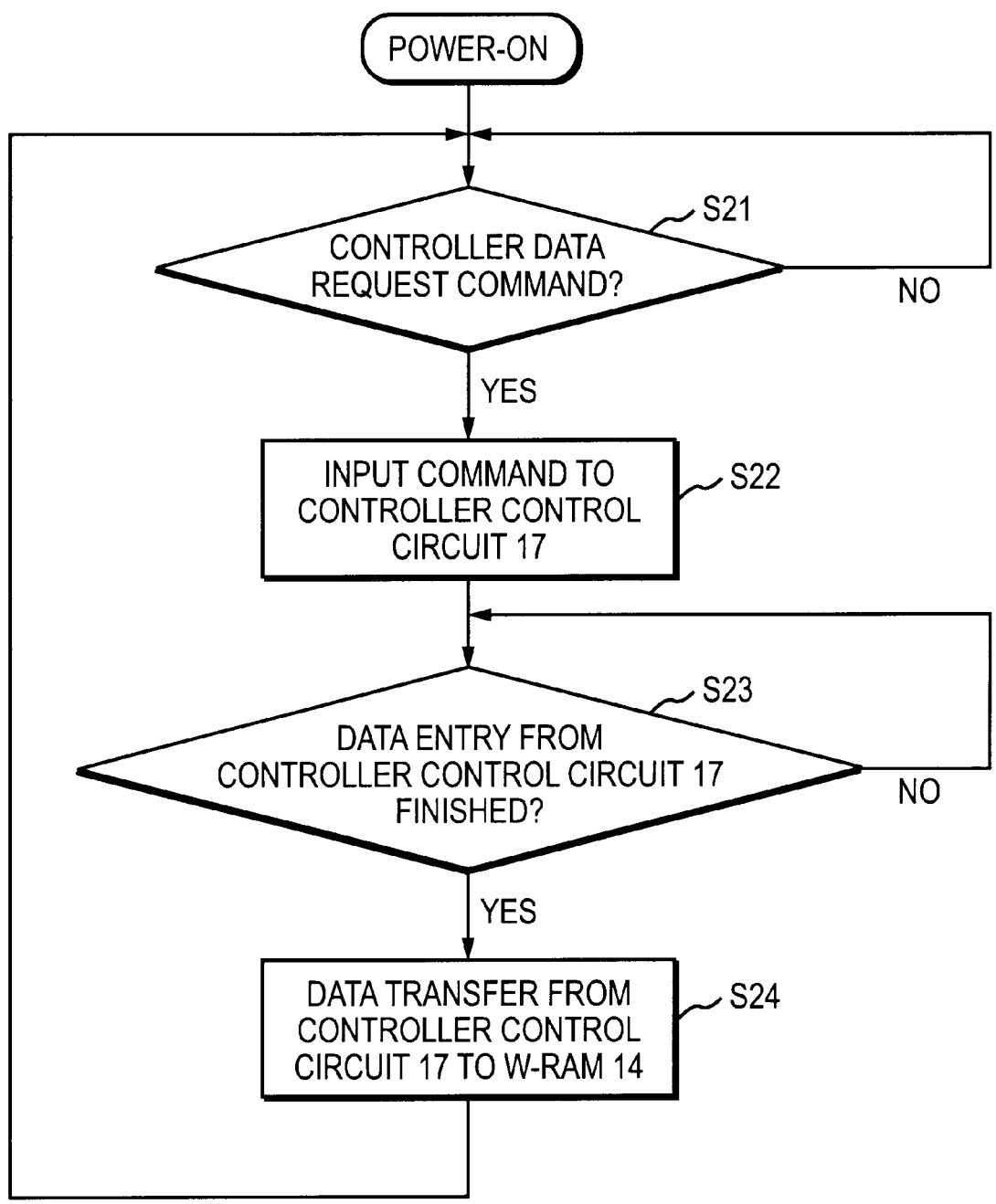
FIG. 18 is a flowchart showing operation of the bus control circuit of the FIG. 3 embodiment.

The operation of the bus control processing circuit 12 is explained in conjunction with FIG. 18. At a step S21, the bus control circuit 12 determines whether or not the CPU 11 has output a controller data request command (a request command for data relating to the switches of the controller 40 or data on the extension device 50). If a controller data request command has not been output, the processing circuit 12 waits until one is output. If a controller data request command has been outputted, the process proceeds to a step S22. At the step S22, the bus control circuit 12 outputs a command for reading in data of the controller 40 (command 1 or command 2 referred to above) to the controller control circuit 17. Then, at a step S23, the bus control circuit 12 determines whether or not the controller control circuit 17 has received data from the controller 40 to store it in the RAM 174. If the controller control circuit 17 has not received data from the controller 40 to store in the RAM 174, the bus control circuit 12 waits at step S23. If the controller control circuit 17 has received data from the controller 40 to store in the RAM 174, the process proceeds to a step S24. At step S24, the bus control circuit 12 transfers the data of the controller 40 stored in the RAM 174 to the W-RAM 14. The bus control circuit 12, when completing the data transfer to the W-RAM 14, returns the process back to the step S21 to repeat execution of the step S21–the step S24.

The FIG. 17 and FIG. 18 flowcharts show the example wherein, after the bus control circuit 12 has transferred data from the RAM 174 to the W-RAM 14, the CPU 11 processes the data stored in the W-RAM 14. However, the CPU 11 may directly process the data in the RAM 174 through the bus control circuit 11.

Figure 19:
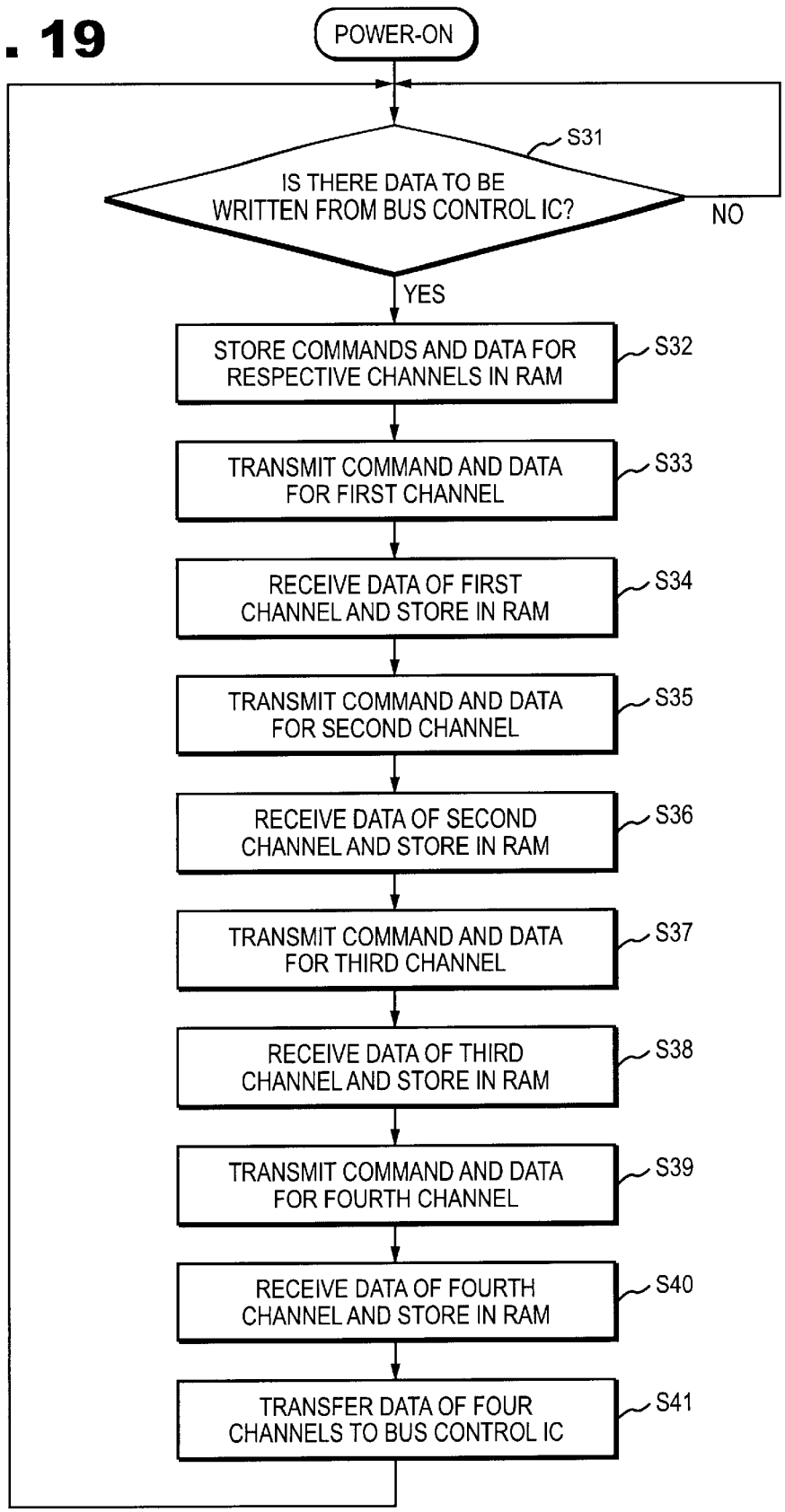
FIG. 19 is a flowchart showing operation of the controller control circuit of FIG. 3 embodiment.

FIG. 19 is a flowchart for explaining the operation of the controller control circuit 17. At a step S31, it is determined whether there is data to be written by the bus control circuit 12. If there is not, the data transfer control circuit 171 waits until there is data to write-in from the bus control circuit 12. If there is data to be written, at a next step S32 the data transfer control circuit 171 causes the RAM 174 to store commands for the first to the fourth channels and/or data (hereinafter abbreviated as "command/data"). At a step S33, the command/data for the first channel is transmitted to the controller 40 being connected to the connector 181. The control circuit 442 performs a predetermined operation based on the command/data to output data to be transmitted to the game machine 10. The content of the data will be described below in explaining the operation of the control circuit 442. At a step S34, the data transfer control circuit 171 receives data output from the control circuit 442, to cause the RAM to store the data.

At a step S35 the command/data for the second channel is transmitted to the controller 40, in a manner similar to the operation for the first channel at the steps S33 and S34. The control circuit 442 performs a predetermined operation based on this command/data to output the data to be transmitted to the game machine 10. At a step S36 data transfer and write-in processes are carried out for the second channel. Meanwhile, at a step S37, the command/data for the fourth channel is transmitted to the controller 40. The control circuit 442 performs a predetermined operation based on this command/data to output the data to be transmitted to the game machine 10. At a step S38 data transfer and write-in processes are carried out for the third channel. Furthermore, at a step S39. the command/data for the fourth channel is transmitted to the controller 40. The control circuit 442 of the controller 40 performs a predetermined operation based on this command/data to output the data to be transmitted to the game machine 10. At a step S40 data transfer and write-in processes are carried out for the fourth channel. At a subsequent step S41, the data transfer circuit 171 transfer in batch the data which have received at the steps S34, S36, S38 and S40 to the bus control circuit 12.

In the above-identified manner, the data for the first channel to the fourth channel, that is, the commands for the controllers 40 connected to the connectors 181–184 and the operating state data to be read out of the controllers 40, are transferred by time-divisional processing between the data transfer control circuit 171 and the control circuit 442 respectively within the controllers 40.

Figure 20:
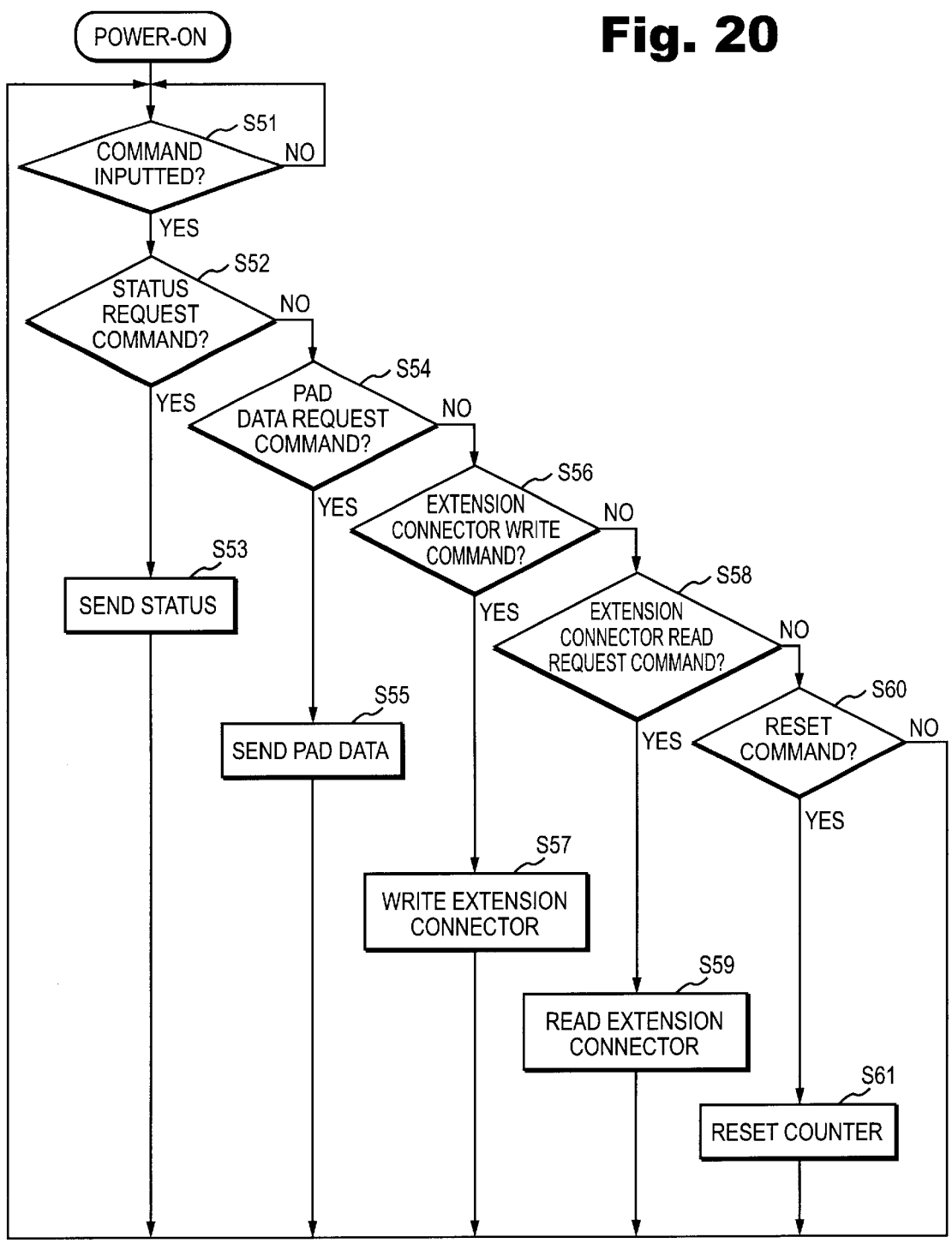
FIG. 20 is flowchart showing operation of the controller circuit of FIG. 3 embodiment.
Figure 21:
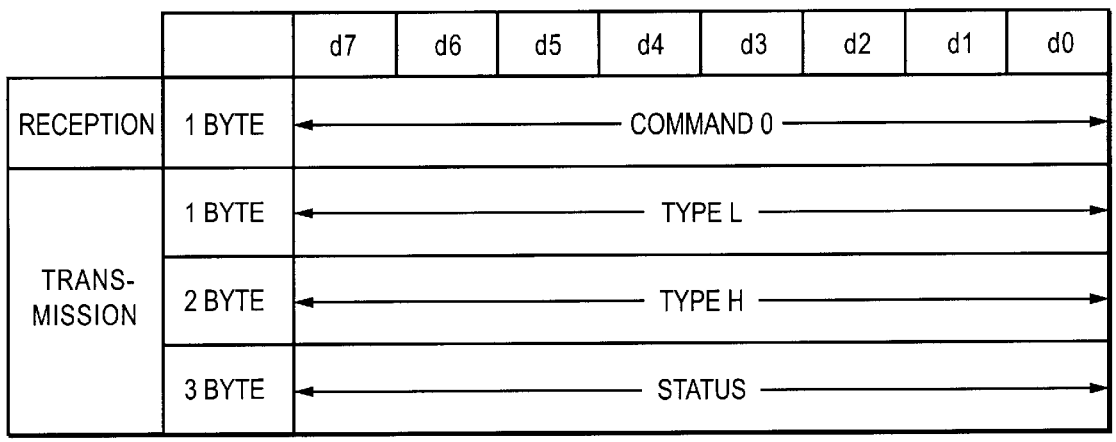
FIG. 21 is an illustrative view of transmission and reception data by the control circuit when a command "0" is transmitted from the controller control circuit.
Figure 22:
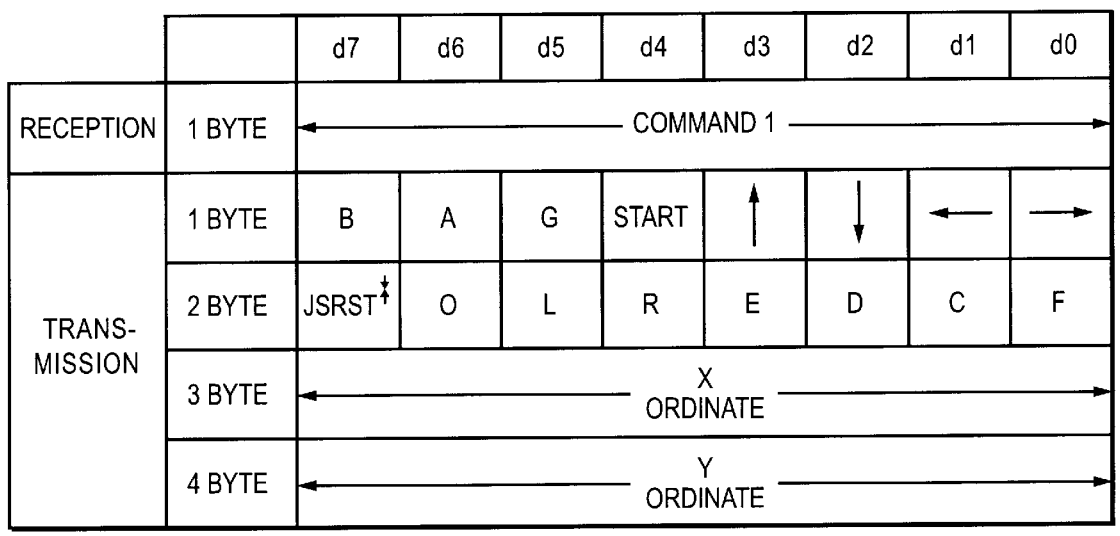
FIG. 22 is an illustrative view of transmission and reception data by the control circuit when a command "1" is transmitted from the controller control circuit.

FIG. 20 is a flowchart explaining the operation of the controller circuit 44. First, at a step S51, it is determined whether or not a command has been input from the image processing circuit 10 to the control circuit 442. If no command has been inputted, the controller circuit waits for a command. If a command is input, at a step S52 it is determined whether or not the command inputted to the control circuit 442 is a status request command (command "0"). If a command "0" is detected, the process proceeds to a step S53, wherein a status transmitting process is carried out.

At the step S53, where the CPU 11 outputs the command "0", the data in the format as shown in FIG. 13 is transmitted and received between the game machine 10 and the controller 40. On this occasion, the control circuit 442, when receiving the command "0" data configured by 1 byte (8 bits), transmits TYPE L (1 byte), TYPE H (1 byte) and the status. Here, TYPE L and TYPE H are data for identifying the function of a device or apparatus being connected to the joyport connector 46, which are inherently recorded in the RAM cartridge 50. This make possible recognition by the game machine 10 as to what extension device (e.g., a RAM cartridge 50 or other extension devices such as a liquid crystal display) is connected to the controller 40. The status is data representative of whether or not an extension device such as a RAM cartridge 50 is connected to the port and whether or not the connection of the extension device is after resetting.

On the other hand, at the step S52 if the determination reveals that there is not a command "0", it is determined at a step S54 whether or not the inputted command is a pad-data request command (command "1"). If it is a command "1", the process proceeds to a step S55 where the process of transmitting pad data is performed. Specifically, where the CPU 11 outputs a command "1", the data in format as shown in FIG. 14 is transmitted and received between the game machine 10 and the controller 40. On this occasion, the control circuit 442, if receiving command "1" data configured by 1 byte (8 bits), transmits the data of 14 switches (16 bits) of B, A, G, START, upper, lower, left, right, L, R, E, D, C and F, the data of JSRST (1 bit); and the data of the counter 444X and the counter 444Y (16 bits). By transmitting these data to the game machine 10, the game machine 10 recognizes how the operator operated the controller 40. Thus, these data are utilized for modifying the image by the game machine 10 in accordance with the operating state of the controller 40 as manipulated by the player.

At the foresaid step S54, if the determination reveals that there is not a command "1", it is determined at step S56 whether or not the input command is a read-out request command (command "2") for data associated with the RAM cartridge 50 to be connected to the extension connector. If it is a command "2", the process proceeds to a step S57 where the process of reading out of the extension connector is performed. Specifically, where the CPU 11 outputs a command "2", the data in format as shown in FIG. 13 is transmitted and received between the game machine 10 and the controller 40. On this occasion, when the control circuit 442 receives command "2" data configured by 1 byte (8 bits), address H representative of the higher-order bits (8 bits) of address, address L representative of the lower-order bits (3 bits) of address, and address CRC (5 bits) for checking for error in address data transmitted and received. the control circuit 442 transmits data stored in the RAM cartridge (32 bytes) and CRC (8 bits) for checking for data errors. In this manner, the connection of the RAM cartridge 50 (or other extension devices) and the game machine 10 enables the game machine 10 to process data from the RAM cartridge 50, etc.

Figure 23:
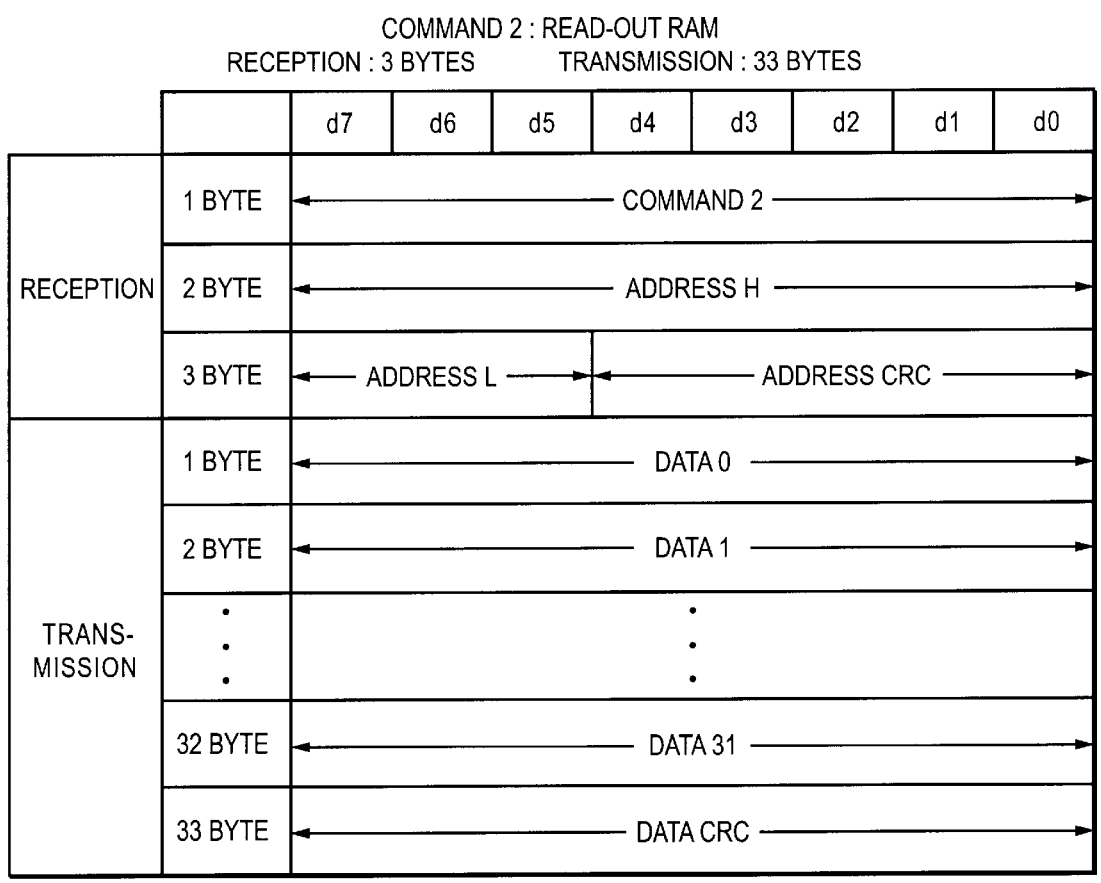
FIG. 23 is an illustrative view of transmission and reception data by the control circuit when a command "2" is transmitted from the controller control circuit.
Figure 24:
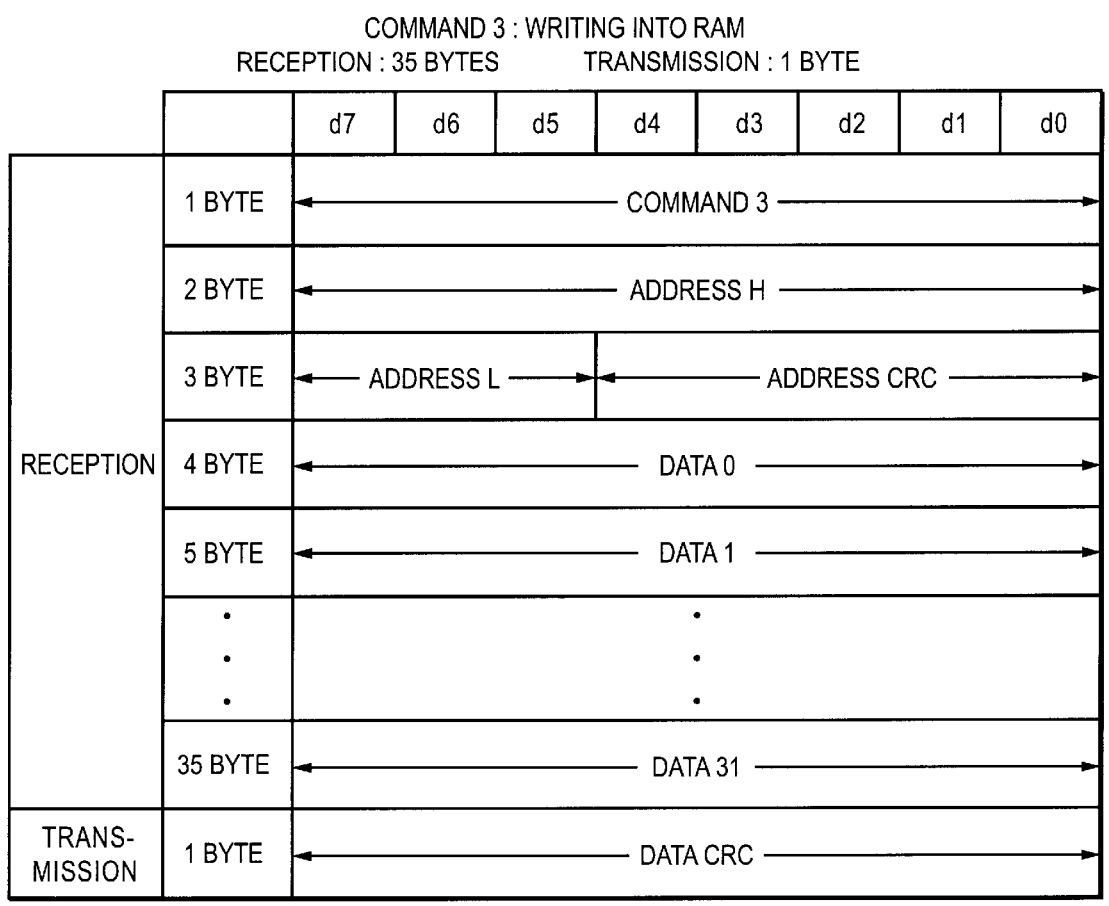
FIG. 24 is an illustrative view of transmission and reception data by the control circuit when a command "3" is transmitted from the controller control circuit.

At the aforesaid step S56, if the determination is not a command "2", it is determined at a subsequent step S58 whether or not the inputted command is write-in request command (command "3") for information associated with the RAM cartridge 50 being connected to the extension connector 46. Where it is the command "3", the process of data read-out is carried out at a step S59 for the RAM cartridge 50 being connected to the extension connector 46. Specifically, if the CPU 11 outputs a command "3", the data shown in FIG. 23 is transmitted and received, in response to the command "3", between the game machine 10 and the controller 40.

That is, when the control circuit 442 receives command "3" data configured by 1 byte (8 bits), address H representative of the higher-order bits of address (8 bits), address L representative of the lower-order bits of address (3 bits), address CRC for checking for error in address data transmitted and received (5 bits), and data to be transmitted to the RAM cartridge 50 (32 bytes), it transmits CRC for checking for error for data received (8 bits). In this manner, the connection of the extension device 50 and the game machine 10 enables the game machine 10 to control the extension device 50. The connection of the extension device 50 and the game machine 10 also drastically improves the function of the controller 40.

Figure 25:
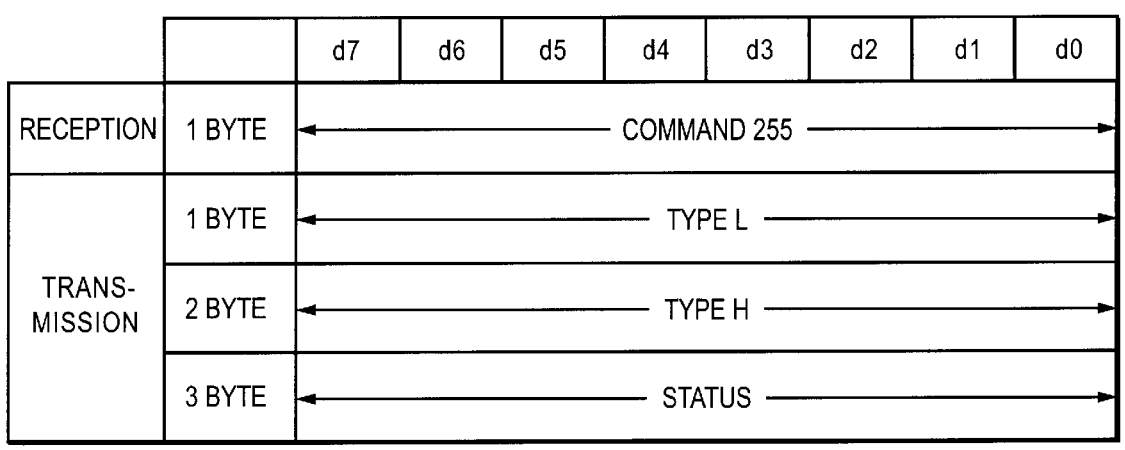
FIG. 25 is an illustrative view of transmission and reception data by the control circuit when a command "255" is transmitted from the controller control circuit.

If at the aforesaid step S58 the determination is not a command "3", it is determined at a step S60 whether or not it is a reset command (command 255). Where it is the reset command (255), the process of resetting the counter 444 for the joystick 45 is performed at step S61.

Where the CPU 11 outputs a reset command (command 255), the data shown in FIG. 25 is transmitted and received between the game machine 10 and the controller 40. That is, the control circuit 442 of the controller 40, if receiving command 255 data configured by 1 byte (8 bits), outputs a reset signal to reset the X counter 444X and counter 444Y and transmits aforesaid TYPE L (1 byte), TYPE H (1 byte) and the status.

Figure 26:
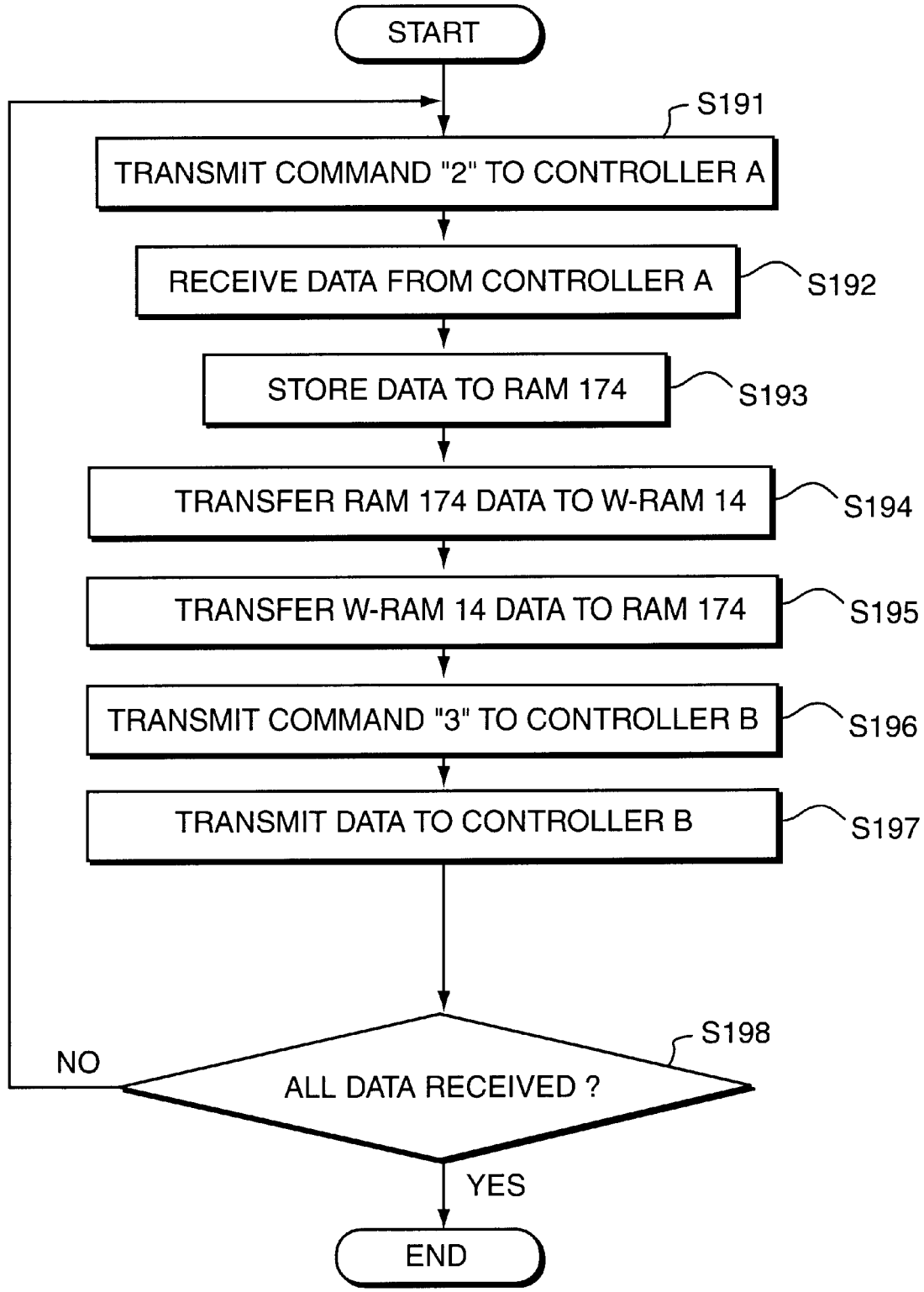
FIG. 26 is a flowchart showing a data copy operation.

The operation by the controller control circuit 17 of transferring data will be explained using the flowchart in FIG. 26, wherein the data, stored in a RAM 51 within an extension device 50 connected to a joy port connector 46 of a controller 40 (controller A) having a connection jack 41 connected to the controller connector 181 is transferred to a RAM 51 within an extension device 50 connected to a joy port connector 46 of a controller (controller B) having a connection jack 41 connected to the controller connector 182.

First, if the operator operates the controller 40 to determine commencement of backup or if the start of a copying operation is determined by the program, the data transfer control circuit 171 transmits a command "2" to the controller A at a step S191. The controller A performs a predetermined operation in accordance with the command "2" to transfer the data stored in the RAM 51 to the data transfer control circuit 171. At a step S193, the data transfer control circuit 171 stores the data received from the controller A to the RAM 174. At a step S194 the data transfer control circuit 171 transfers the data stored in the RAM 174 to the W-RAM 14. When the data format is different between the RAM 51 connected to the controller A and the RAM 51 connected to the controller B, the data stored in the W-RAM 14 is altered by the CPU 11. At a step S195 the data transfer control circuit 171 transfers the data stored in the W-RAM 14 to the RAM 174. At a step S197, the data transfer control circuit 171 transmits a command "3" to the controller B. At a step S196, the data transfer control circuit 171 transmits the data stored in the RAM 174 to the controller B. At a step S198, it is determined whether or not the data to be transferred from the controller A to the controller B have all been transferred. If the transfer is completed, the backup operation is ended. Where the transfer is not completed, the step S191 through the step S198 are executed again.

By executing the step S191 through the step S198 in this manner, it is possible to store the data stored in the RAM 51 of the extension device 50 connected to the controller A to the RAM 51 of the extension device 50 connected to the controller B.

By so doing, it is possible to analyze a competition record of a competitor for future battle references. Even when a racing game or a baseball game is played alone, it is possible to compete with a competitor's machine or baseball team by using machine tuning data or baseball team data of a competitor.

A detailed operation for resetting the joystick 45 will be described next.

In order to reset the joystick 45 to determine an origin point thereof, there are three methods, i.e., a method through button operation, a method through turning-on/off the power source, and a method controlled by the image processor 10.

(1) A reset operation by operating the buttons.

Figure 27:
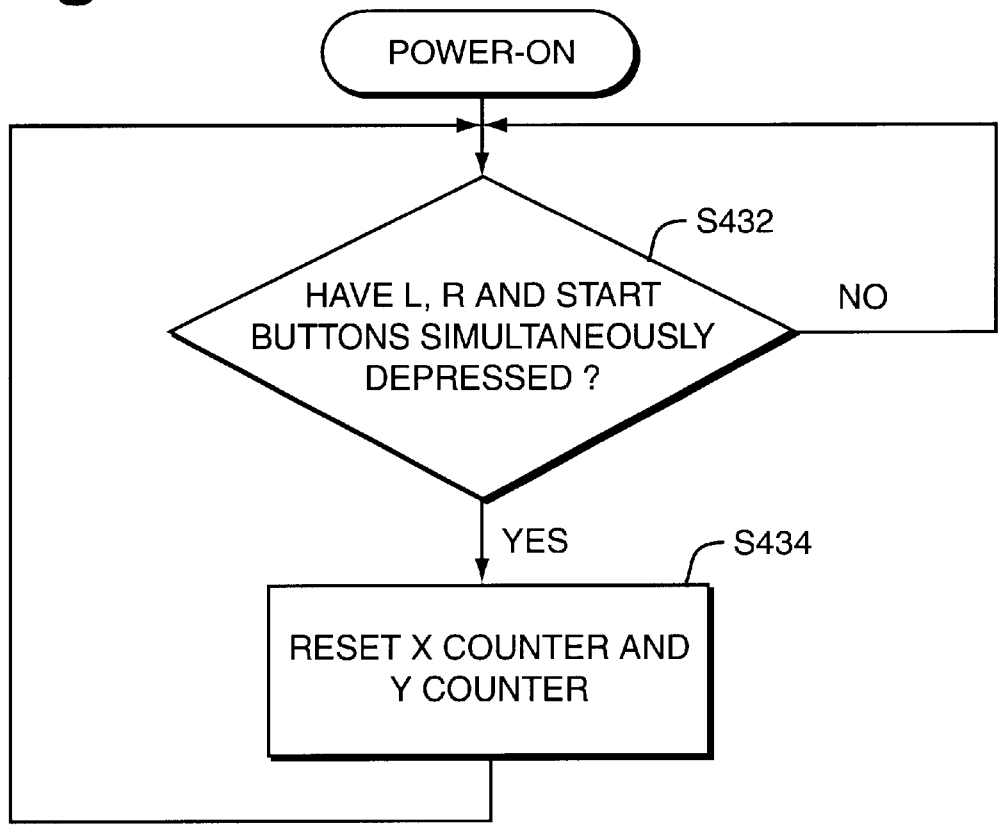
FIG. 27 is a flowchart showing a first method of origin point resetting.

With reference to the flowchart shown in FIG. 27, a reset operation is shown for the counter 444 which stores data indicative of an inclined state of the joystick 45, First, in a step S432, the switch signal detection circuit 443 detects whether or not the buttons 406L*b* 406R and 405 are simultaneously depressed. Then, if the three buttons are not depressed, the detection of the switch signals is performed continuously. Furthermore, if the three buttons are simultaneously depressed, the reset signal is outputted.

In response to the reset signal, in a step S434, the count values of the X counter 444X and the Y counter 444Y are reset. Therefore, the origin point of the joystick is determined at every time that, for example, the buttons 406L, 406R and 405 are simultaneously depressed.

In this embodiment, at a time that the buttons 406L. 406R and 405 are simultaneously depressed by the operator, the reset signal is generated by the switch signal detection circuit 443; however, the number of the buttons is not limited to three (3), and may, for example, be two (2) or four (4). Furthermore, buttons simultaneously depressed are not limited to the above described buttons, and may be arbitrary buttons.

(2) A reset operation by turning-on/off the power source.

Figure 28:
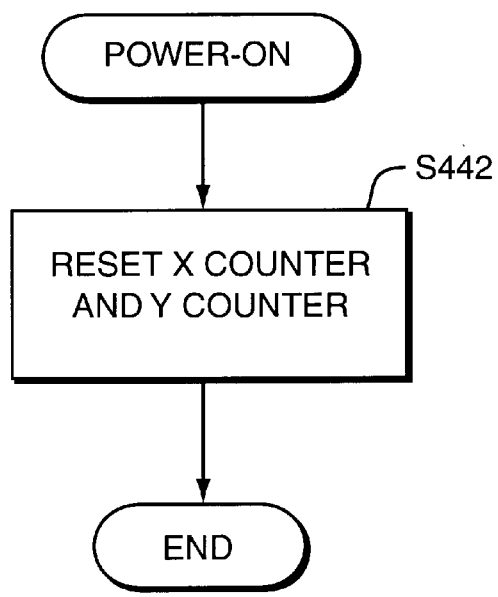
FIG. 28 is a flowchart showing a second method of origin point resetting.

With referring to a flowchart shown in FIG. 28, another reset operation of the counter 444 will be described. A reset signal is output from a power-on reset circuit 447 in response to the power source switch (not shown) of the image processor 10 being turned-on by the operator when the controller 40 is connected to the image processor 10, or in response to a fact that the power source is supplied to the controller 40 by inserting the connection jack of the controller 40 into one of the controller connectors 181–184 of the image processor 10 when no controller 40 is connected to the image processor 10. In response to such a reset signal, in a step S442, the count values of the X counter 444X and the Y counter 444Y are reset. Therefore, the origin point of the joystick is determined at every time that the power source is supplied to the controller 40.

(3) A reset operation by the image processor 10.

The counter 444 is also reset by executing the steps S60 and S61 shown in the above described FIG. 20. Through such a reset operation, it is possible to freely determine the origin point of the joystick 45 by the program in accordance with a processing status of the image processor 10.

According to the above described methods, it is possible to reset the X counter 444X and the Y counter 444Y. If the reset signal is output at a time that the lever 474 is in its neutral position, that is, at a time that the lever 474 is not operated by the operator, it is possible to prevent erroneous count values from being stored in the X counter 444X and the Y counter 444Y, and therefore, it is possible to prevent the erroneous count values from being transmitted to the image processor 10.

Next, one example where the monitor screen is changed using the controller 40 will be described with referring to FIG. 29. A left illustration in FIG. 29 shows the physically inclined amount of the lever 474 using orthogonal X–Y coordinates. More specifically, a circle illustrated at a center indicates the lever 474, and in this illustration, a state where the operator does not operate the lever 474, that is, a state where the lever 474 stands upright with respect to the housing. If the lever 474 is inclined toward a front side, the circle is moved in a +(positive) direction in the Y axis, and if the lever 474 is inclined toward a rear side, the circle is moved in a −(negative) direction of the Y axis. Furthermore, if the lever 474 is inclined toward a right direction, the circle is moved in a +(positive) direction of the X axis, and if the lever 474 is inclined toward a left side, the circle is moved in a −(negative) direction of the X axis.

A right illustration in FIG. 29 shows a display screen of a game where an enemy 34 is aimed by inclining the lever 474 toward front, rear, left and right so as to move an aiming device 35 toward upper, lower, left and right. Clouds 31, mountains 32 and buildings 33 constitute a background image which can be changed by, for example, scrolling, the enemy 34 is an object which can freely move within the screen. For example, when the enemy 34 is displayed in a right upper portion of the screen, if the operator inclines the lever 474 toward right and then front, the X counter 444X and the Y counter 444Y are both incremented, and thus, the count values thereof become larger. The count values are transmitted to the image processor 10 which changes a display position of the aiming device 35 thereby utilizing the data of the count values. Therefore, the aiming device 35 becomes to be super-positioned on the enemy 34. Then, at a timing the aiming, device 35 is just super-positioned on the enemy 34, if the button such as the button 404A is depressed, the switch data of the button is also transmitted to the image processor 10 similar to the counter data. Accordingly, the image processor 10 generates the image signal so as to display a missile (not shown) or the like which can attack the enemy 34 on the screen.

Next, one example of a case where the analog joystick is reset in a state where the lever 474 is deviated from the center, that is, the lever 474 is inclined will be described with reference to FIG. 30.

When the X counter 444X and the Y counter 444Y are reset at the coordinate position indicated by a solid circular line in a left illustration in FIG. 30, if the operator releases his or her hand from the lever 474, the lever 474 returns to the center of the coordinate, i.e., a position indicated by a dotted circular line. A change of the image will be described with utilizing a right illustration in FIG. 30. First, when the X counter 444X and the Y counter 444Y are reset, as similar to the right illustration in FIG. 29, the aiming device 35 is displayed at the solid circular line because the count values of the X counter 444X and the Y counter 444Y are both "0" equal to the initial values. Next, if the operator releases his or her hand from the lever 474, the lever 474 returns to the center position of the coordinate, and the X counter 444X within the controller 40 is incremented and the Y counter 444Y is decremented, and therefore, the count values of the counters 444X and 444Y become larger and smaller, respectively. The count values are transmitted to the image processor 10 which changes the display position of the aiming device 35 with utilizing the data of the count values to the position of an aiming device 35 indicated by a dotted line.

A description will be made of such a reset operation which is performed at a certain point in time. For example, if the operator presumes the position that the enemy 34 appears is the position of the aiming device 35 shown by the dotted line in the right illustration in FIG. 30, the operator wishes to super-position the aiming device 35 at the position of the dotted line aiming device 35 at an instance that the enemy 34 appears. However, if the aiming device 35 is continuously kept on the dotted line aiming device 35, the operator who is a game player will be bored, and there is a further possibility that if the enemy 34 appears at a place not presumed, the operator cannot attack the enemy, and therefore, in order to super-position the aiming device 35 on the position of the dotted line aiming device 35 at an instance that the enemy 34 appears, and to freely move the aiming device 35 to other places, the above described reset function is used. In describing an action of the operator more specifically, the operator first inclines the lever 474 such that the aiming device 35 is displayed at a position symmetrically corresponding to the position presumed that the enemy 34 will appear (the position of the dotted line aiming device 35) with reference to the solid line aiming device 35. At that time, the physical coordinate position of the lever 474 becomes the solid circular line in the left illustration in FIG. 29. Then, the operator, for example, simultaneously depresses the three buttons of the buttons 406L, 406R and 405. In response to the depression, the X counter 444X and the Y counter 444Y are both reset, and the aiming device 35 is displayed at the position of the solid line aiming device 35. Then, the operator freely moves the aiming device 35, and waits for an appearance of the enemy 34. If the enemy 34 appears at the position of the dotted line aiming device 35, the operator releases the hand from the lever 474. Therefore, the lever 474 returns to the physical coordinate position shown by the dotted circular line in the left illustration in FIG. 29. Resultingly, the aiming device 35 is displayed at the dotted line aiming device 35. When the operator surely super-positions the aiming device 35 on the enemy 34, and depresses the switch such as the button 404A, a missile (not shown) or the like which attacks the enemy 34 is displayed on the screen.

Furthermore, if the reset operation is performed in the above described manner, it is possible to greatly move the lever 474 toward a right lower direction, and therefore, the above described reset operation is also effective at a time that the operator wishes to greatly move the lever 474 toward a right lower direction.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. For use in a video game system having a main console including a video game processing system for executing a video game program to generate a video game display on a display, a player controller comprising:

a moving object position control mechanism for generating data indicative of a display position of a displayed object and which, in use, is tilted by an operator within a desired range to control movement of a displayed object along any one of a substantially continuous range of angular directions;

detecting circuitry for generating data indicative of the direction and the rate of movement which a displayed object is to be moved;

interface circuitry for sending data indicative of the direction and the rate of movement which a displayed object is to be moved to said video game console and for receiving data and commands from said console;

a plurality of control keys; and processing circuitry coupled to said interface circuitry for receiving at least one command from said video game processing system and for transferring operation member position data and information relating to the state of at least one of said plurality of control keys to said video processing system in response to said at least one command, wherein said moving object position control mechanism is supported such that it stops at a desired position when not being manipulated by the operator to thereby define a point of origin, said control mechanism being capable of generating operation member position data for controlling movement of a displayed object with respect to a coordinate reference frame defined by said point of origin, said player controller further including a liquid crystal display operatively coupled to said processing circuitry.

2. A player controller according to claim 1 further including transmitting circuitry for transmitting data to said video game console using duty cycle modulation.

3. A player controller according to claim 1, further including receiving circuitry for demodulating information received from said main console.

4. A player controller according to claim 1, further including a removable memory which is accessible by said video game processing system via said interface circuitry for storing video game related data.

5. A player controller in accordance with claim 1, further including a liquid crystal display controller for receiving control signals from said data processing circuitry and for coupling data to be displayed and control signals to said liquid crystal display.

6. A player controller in accordance with claim 5, wherein said liquid crystal display is embodied in an expansion device which is removably connectable to said player controller.

7. For use in a video game system having a main console including a video game processing system for executing a video game program to generate a video game display on a display, a player controller comprising:

moving object position control mechanism for generating data indicative of the display position with respect to a coordinate reference frame of a displayed object and which, in use, is tilted by an operator within a desired range to control movement of a displayed object along any one of a substantially continuous range of angular directions;

a plurality of control keys for generating control signals for initiating a control function controlled by said video game processing system;

interface circuitry for exchanging information between said player controller and said console;

data processing circuitry, coupled to said interface circuitry, for receiving at least one command from said video game processing system for controlling the transmission of said data indicative of the display position of a displayed object and said control signals for initiating a control function; and an expansion device coupled to said data processing circuitry, wherein said video game processing system is operable to communicate with said data processing circuitry and to transfer video game related data to said expansion device, said video game related data being coupled to said expansion device under the control of said data processing circuitry.

8. A player controller according to claim 7, further including transmitting circuitry coupled to said data processing circuitry for transmitting said data indicative of the display position of a displayed object and said control signals for initiating a control function to said video game console using duty cycle modulation.

9. A player controller according to claim 7, further including receiving circuitry coupled to said processing circuitry for demodulating information received from said main console.

10. A player controller in accordance with claim 7, further including
a directional switch for controlling the direction of movement of displayed object.

11. For use in a video game system having a main console including a video game processing system for executing a video game program to generate a video game display on a display, a player controller comprising:

a moving object position control mechanism for generating data indicative of the display position of a displayed object and which, in use, is tilted by an operator within a desired range to control movement of a displayed object along any one of a substantially continuous range of angular directions;

detecting circuitry for generating data indicative of the direction and the rate of movement which a displayed object is to be moved;

interface circuitry for sending data indicative of the direction and the rate of movement which a displayed object is to be moved to said video game console and for receiving data and commands from said console;

a plurality of control keys; and processing circuitry coupled to said interface circuitry for receiving at least one command from said video game processing system and for transferring operation member position data and information relating to the state of at least one of said plurality of control keys to said video processing system in response to said at least one command, said player controller further including a removable memory which is accessible by said video game system via said interface circuitry in response to communication between said video game processing system and said processing circuitry for storing video game related data, an expansion port located within a cavity in said player controller and electrically coupled to said interface circuitry, and wherein said memory includes a RAM memory sized to fit into said cavity associated with said expansion port embodied and accessible by the video processing system via the expansion port and said processing circuitry.

12. For use in a video game system having a main console including a video game processing system for executing a video game program to generate a video game display on a display, a player controller having a housing sized to be held in a player's hand, said player controller comprising:

a moving object position control mechanism for generating data indicative of the display position of a displayed object and which, in use, is tilted by an operator within a desired range to control movement of a displayed object along any one of a substantially continuous range of angular directions;

detecting circuitry for generating data indicative of the direction and the rate of movement which a displayed object is to be moved;

interface circuitry for sending data indicative of the direction and the rate of movement which a displayed object is to be moved to said video game console and for receiving data and commands from said console;

a plurality of control keys protruding from a surface of said housing and disposed at a first location on said housing;

processing circuitry coupled to said interface circuitry for receiving at least one command from said video game processing system and for transferring operation member position data and information relating to the state of at least one of said plurality of control keys to said video processing system in response to said at least one command; and a liquid crystal display disposed at a second location on said housing for displaying video game related data in accordance with a video game program and under the control of said processing circuitry.

13. A player controller in accordance with claim 12, further including a liquid crystal display controller for receiving data and control signals from said interface circuitry to control the display of video game related data.

14. For use in a video game system having a main console including a video game processing system for executing a video game program to generate a video game display on a display, a player controller comprising:

a moving object position control mechanism for generating data indicative of the display position with respect to a coordinate reference frame of a displayed object and which, in use, is tilted by an operator within a desired range to control movement of a displayed object along any one of a substantially continuous range of angular directions;

a plurality of control keys for generating control signals for initiating a control function controlled by said video game processing system;

interface circuitry for exchanging information between said player controller and said console;

data processing circuitry, coupled to said interface circuitry, for receiving at least one command from said video game processing system controlling the transmission of said data indicative of the display position of a displayed object and said control signals for initiating a control function; and an expansion device coupled to said data processor, wherein said video game processing system is operable to communicate with said video game processing system and to transfer video game related data to said expansion device, said video game related data being coupled to said expansion device under the control of said data processing circuitry, wherein said expansion device includes a removable memory which is accessible by said video game processing system via said data processing circuitry.

15. A player controller in accordance with claim 14, further including a directional switch for controlling the direction of movement of a displayed object.

16. A player controller in accordance with claim 14, wherein said expansion device includes a liquid crystal display for displaying video game related data in accordance with a video game program.

17. A player controller in accordance with claim 16, further including a liquid crystal display controller for receiving data and control signals from said interface circuitry to control the display of video game related data.

18. For use in a video game system having a main console including a video game processing system for executing a video game program to generate a video game display on a display, a player controller comprising:

a moving object position control mechanism for generating data indicative of the display position with respect to a coordinate reference frame of a displayed object and which, in use, is tilted by an operator within a desired range to control movement of a displayed object along any one of a substantially continuous range of angular directions;

a plurality of control keys for generating control signals for initiating a control function controlled by said video game processing system;

interface circuitry for exchanging information between said player controller and said console;

a data processor, coupled to said interface circuitry, for controlling the transmission of said data indicative of the display position of a displayed object and said control signals for initiating a control function; and an expansion device coupled to said data processor, wherein said video game processing system is operable to transfer data to said expansion device; and an expansion port located within a cavity in said player controller and electrically coupled to said interface circuitry, and wherein said memory includes a RAM memory sized to fit into said cavity associated with said expansion port embodied and accessible by the video processing system via the expansion port.

* * * * *